(12) United States Patent
Winston et al.

(10) Patent No.: US 11,645,884 B2
(45) Date of Patent: *May 9, 2023

(54) LAYERED DISPLAY MONITORS

(71) Applicant: Aristocrat Technologies Australia Pty Limited, North Ryde (AU)

(72) Inventors: Eric Winston, Reno, NV (US); Timothy Seckel, Streamwood, IL (US)

(73) Assignee: Aristocrat Technologies Australia Pty Limited, North Ryde (AU)

( * ) Notice: Subject to any disclaimer, the term of this patent is extended or adjusted under 35 U.S.C. 154(b) by 0 days.

This patent is subject to a terminal disclaimer.

(21) Appl. No.: 17/664,391

(22) Filed: May 20, 2022

(65) Prior Publication Data
US 2022/0284758 A1 Sep. 8, 2022

Related U.S. Application Data

(60) Division of application No. 16/949,787, filed on Nov. 13, 2020, now Pat. No. 11,354,970, which is a
(Continued)

(51) Int. Cl.
*G07F 17/32* (2006.01)
*G06F 1/16* (2006.01)

(52) U.S. Cl.
CPC ........ *G07F 17/3211* (2013.01); *G06F 1/1607* (2013.01); *G06F 1/1616* (2013.01);
(Continued)

(58) Field of Classification Search
CPC ............. G07F 17/3211; G07F 17/3267; G06F 1/1607; G06F 1/1624; G06F 1/1677
See application file for complete search history.

(56) References Cited

U.S. PATENT DOCUMENTS

| 6,532,146 | B1 | 3/2003 | Duquette |
| 7,775,888 | B2 | 8/2010 | Wudtke |

(Continued)

OTHER PUBLICATIONS

U.S. Final Office Action dated Sep. 20, 2019 in U.S. Appl. No. 16/009,043.
(Continued)

*Primary Examiner* — Seng H Lim
(74) *Attorney, Agent, or Firm* — Weaver Austin Villeneuve & Sampson LLP

(57) ABSTRACT

An electronic gaming machine (EGM) may include one or more movable displays. One or more movable displays may be used to present a base game when in a first configuration. In response to a trigger event, the movable display(s) may reveal a game feature presentation device, such as a stationary display or a set of mechanical reels, which was hidden when the one or more movable displays were in the first configuration. The underlying game feature presentation device may be used to present a bonus feature and/or to present a different aspect of the base game. Alternatively, the movable display(s) may be hidden (e.g., inside the EGM) when in a first configuration, during which time a fixed display portion may be presenting a base game. The movable display(s) may present a bonus feature and/or a different aspect of the base game when in the second configuration.

20 Claims, 16 Drawing Sheets

Related U.S. Application Data continuation of application No. 16/009,043, filed on Jun. 14, 2018, now Pat. No. 10,872,490.

(52) U.S. Cl.
CPC ........ *G06F 1/1624* (2013.01); *G07F 17/3216* (2013.01); *G07F 17/3267* (2013.01); *G07F 17/3269* (2013.01); *G06F 1/1677* (2013.01)

(56) References Cited

U.S. PATENT DOCUMENTS

| | | | |
|---|---|---|---|
| 7,780,534 | B2 | 8/2010 | Wudtke |
| 7,905,783 | B2 | 3/2011 | Cole |
| 8,388,444 | B2 | 3/2013 | Graf |
| 8,454,436 | B2 | 6/2013 | Klostermann |
| 8,485,881 | B2 * | 7/2013 | Griswold ............ G07F 17/3218 463/16 |
| 8,517,829 | B2 | 8/2013 | Reddy |
| 8,974,297 | B2 | 3/2015 | Massing |
| 9,652,929 | B2 | 5/2017 | Cornell |
| 9,728,030 | B2 | 8/2017 | Woels |
| 10,127,761 | B2 | 11/2018 | Woels |
| 10,636,244 | B1 | 4/2020 | Winston |
| 2004/0043815 | A1 | 3/2004 | Kaminkow |
| 2004/0121840 | A1 | 6/2004 | Rosander |
| 2004/0248648 | A1 | 12/2004 | Rothschild |
| 2005/0040962 | A1 | 2/2005 | Funkhouser |
| 2005/0043090 | A1 | 2/2005 | Pryzby |
| 2006/0046821 | A1 | 3/2006 | Kaminkow |
| 2006/0089190 | A1 | 4/2006 | Bryant |
| 2007/0111776 | A1 * | 5/2007 | Griswold ............ G07F 17/3211 463/16 |
| 2007/0149281 | A1 | 6/2007 | Gadda |
| 2008/0113794 | A1 | 5/2008 | Cole |
| 2008/0265503 | A1 | 10/2008 | Wudtke |
| 2008/0268944 | A1 | 10/2008 | Wudtke |
| 2009/0104991 | A1 | 4/2009 | Seelig |
| 2009/0176568 | A1 | 7/2009 | Reddy |
| 2009/0253485 | A1 | 10/2009 | Nagano |
| 2010/0197397 | A1 | 8/2010 | Graf |
| 2010/0210354 | A1 | 8/2010 | Burak |
| 2011/0304781 | A1 | 12/2011 | Rowell |
| 2012/0002357 | A1 | 1/2012 | Auld |
| 2012/0178523 | A1 | 7/2012 | Greenberg |
| 2012/0220353 | A1 | 8/2012 | Massing |
| 2012/0231869 | A1 | 9/2012 | Englman |
| 2012/0280924 | A1 | 11/2012 | Kummer |
| 2014/0002430 | A1 | 1/2014 | Kwack |
| 2014/0141857 | A1 | 5/2014 | Meyer |
| 2014/0228091 | A1 | 8/2014 | Berman |
| 2014/0357364 | A1 | 12/2014 | Chudek |
| 2017/0156219 | A1 | 6/2017 | Heo |
| 2017/0325343 | A1 | 11/2017 | Seo |
| 2018/0276942 | A1 * | 9/2018 | Whelan ............... G07F 17/3227 |
| 2019/0385401 | A1 | 12/2019 | Winston |
| 2020/0035061 | A1 | 1/2020 | Froy |
| 2020/0111285 | A1 * | 4/2020 | Phillips, Jr. ......... G07F 17/3216 |

OTHER PUBLICATIONS

Notice of Allowance dated Mar. 10, 2020, for U.S. Appl. No. 16/151,197 (pp. 1-9).
Corrected Notice of Allowability dated Apr. 1, 2020, for U.S. Appl. No. 16/151,197 (pp. 1-2).
Office Action dated Jun. 10, 2019 for U.S. Appl. No. 16/009,043 (pp. 1-11).
Office Action dated Jan. 28, 2020 for U.S. Appl. No. 16/009,043 (pp. 1-11).
Office Action dated Jun. 4, 2020 for U.S. Appl. No. 16/009,043 (pp. 1-10).
TPA Motion's ASN telescopic Linear Guides. <https://www.tpa-us.com/asn-series.html>. Accessed May 28, 2020 (Year: 2020).
Notice of Allowance dated Jul. 20, 2020 for U.S. Appl. No. 16/009,043 (pp. 1-6).
Office Action dated Oct. 21, 2019, for U.S. Appl. No. 16/151,197 (pp. 1-14).
Notice of Allowance dated Oct. 15, 2020 for U.S. Appl. No. 16/009,043 (pp. 1-6).
Office Action dated May 7, 2021 for U.S. Appl. No. 16/849,505 (pp. 1-14).
Office Action (Notice of Allowance and Fees Due (PTOL-85)) dated Sep. 2, 2021 for U.S. Appl. No. 16/849,505 (pp. 1-9).
Office Action (Non-Final Rejection) dated Aug. 15, 2022 for U.S. Appl. No. 17/453,140 (pp. 1-10).
Office Action (Notice of Allowance and Fees Due (PTOL-85)) dated Oct. 11, 2022 for U.S. Appl. No. 17/453,140 (pp. 1-12).

* cited by examiner

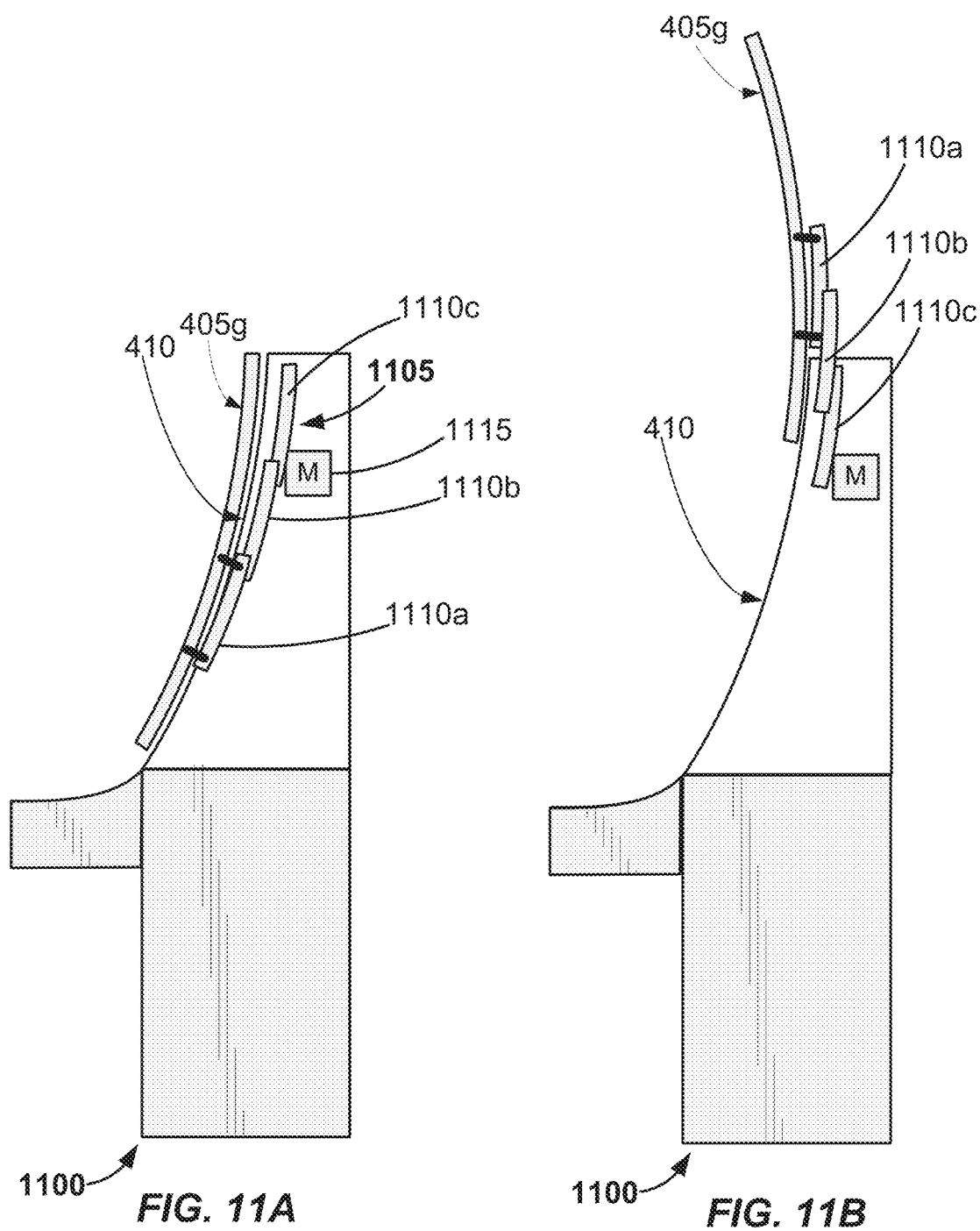

LAYERED DISPLAY MONITORS

CROSS-REFERENCE TO RELATED APPLICATIONS

This application is a divisional of U.S. patent application Ser. No. 16/949,787, filed on Nov. 13, 2020 and entitled "LAYERED DISPLAY MONITORS," which is a continuation of U.S. patent application Ser. No. 16/009,043, filed on Jun. 14, 2018 and entitled "LAYERED DISPLAY MONITORS," both of which are hereby incorporated by reference and for all purposes.

BACKGROUND

Electronic gaming machines ("EGMs") or gaming devices provide a variety of wagering games such as slot games, video poker games, video blackjack games, roulette games, video bingo games, keno games and other types of games that are frequently offered at casinos and other locations. Play on EGMs typically involves a player establishing a credit balance by inputting money, or another form of monetary credit, and placing a monetary wager (from the credit balance) on one or more outcomes of an instance (or single play) of a primary or base game. In many games, a player may qualify for secondary games or bonus rounds by attaining a certain winning combination or triggering event in the base game. Secondary games provide an opportunity to win additional game instances, credits, awards, jackpots, progressives, etc. Awards from any winning outcomes are typically added back to the credit balance and can be provided to the player upon completion of a gaming session or when the player wants to "cash out."

"Slot" type games are often displayed to the player in the form of various symbols arrayed in a row-by-column grid or matrix. Specific matching combinations of symbols along predetermined paths (or paylines) through the matrix indicate the outcome of the game. The display typically highlights winning combinations/outcomes for ready identification by the player. Matching combinations and their corresponding awards are usually shown in a "pay-table" which is available to the player for reference. Often, the player may vary his/her wager to include differing numbers of paylines and/or the amount bet on each line. By varying the wager, the player may sometimes alter the frequency or number of winning combinations, frequency or number of secondary games, and/or the amount awarded.

Typical games use a random number generator (RNG) to randomly determine the outcome of each game. The game is designed to return a certain percentage of the amount wagered back to the player (RTP=return to player) over the course of many plays or instances of the game. The RTP and randomness of the RNG are critical to ensuring the fairness of the games and are therefore highly regulated. Upon initiation of play, the RNG randomly determines a game outcome and symbols are then selected which correspond to that outcome. Notably, some games may include an element of skill on the part of the player and are therefore not entirely random.

SUMMARY

An EGM may include one or more movable displays. In some examples, at least one movable display may be used to present a base game when in a first configuration. When the one or more movable displays are moved from the first configuration to a second configuration, the movable display(s) may reveal what will be referred to herein as a "game feature presentation device," which was hidden when the one or more movable displays were in the first configuration. The game feature presentation device may, for example, include a stationary display, mechanical reels, etc. The one or more movable displays may be moved in response to a trigger event, which may be related to an occurrence in the base game. The game feature presentation device may, for example, be used to present a bonus feature, to present an aspect of the base game and/or to present graphics during a celebration.

In alternative implementations, one or more movable displays may be hidden from view (e.g., inside a cabinet of the EGM) when the one or more movable displays are in a first configuration. In some such examples, a fixed display portion may be used to present a base game when the one or more movable displays are in the first configuration. The movable display(s) may be controlled to present visual effects corresponding to a bonus game, to present an aspect of the base game and/or to present graphics during a celebration when in the second configuration.

BRIEF DESCRIPTION OF THE DRAWINGS

FIGS. 11A and 11B show alternative examples configuring a moveable display of an EGM.

DETAILED DESCRIPTION

Figure 1:
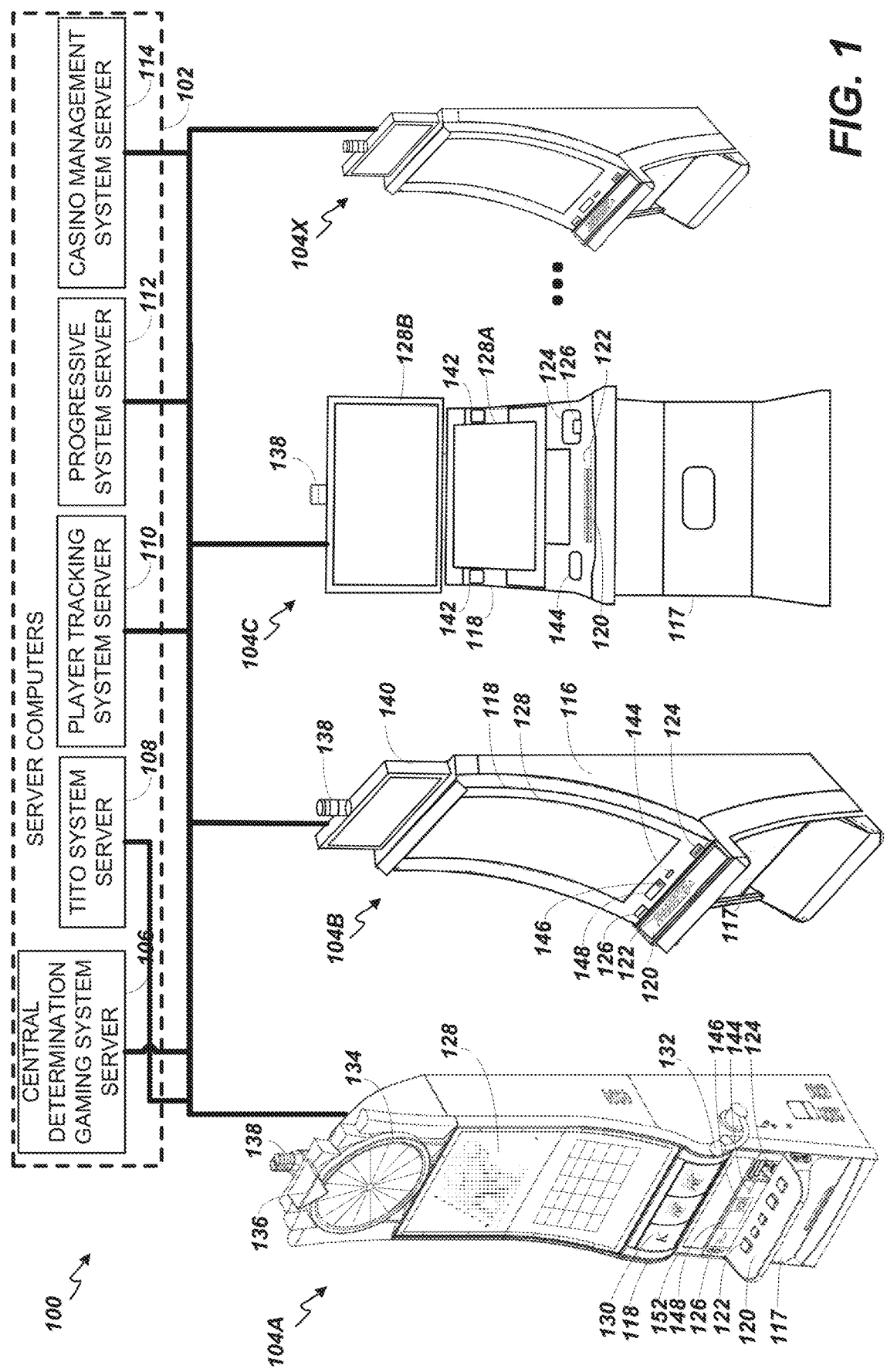
FIG. 1 is a diagram showing examples of several EGMs networked with various gaming related servers.

FIG. 1 illustrates several different models of EGMs which may be networked to various gaming related servers. The present invention can be configured to work as a system 100 in a gaming environment including one or more server computers 102 (e.g., slot servers of a casino) that are in communication, via a communications network, with one or more gaming devices 104A-104X (EGMs, slots, video poker, bingo machines, etc.). The gaming devices 104A-104X may alternatively be portable and/or remote gaming devices.

Communication between the gaming devices 104A-104X and the server computers 102, and among the gaming devices 104A-104X, may be direct or indirect, such as over the Internet through a website maintained by a computer on a remote server or over an online data network including commercial online service providers, Internet service providers, private networks, and the like. In other embodiments, the gaming devices 104A-104X may communicate with one another and/or the server computers 102 over RF, cable TV, satellite links and the like.

In some embodiments, server computers 102 may not be necessary and/or preferred. For example, the present invention may, in one or more embodiments, be practiced on a stand-alone gaming device such as gaming device 104A, gaming device 1048 or any of the other gaming devices 104C-104X. However, it is typical to find multiple EGMs connected to networks implemented with one or more of the different server computers 102 described herein.

The server computers 102 may include a central determination gaming system server 106, a ticket-in-ticket-out (TITO) system server 108, a player tracking system server 110, a progressive system server 112, and/or a casino management system server 114. Gaming devices 104A-104X may include features to enable operation of any or all servers for use by the player and/or operator (e.g., the casino, resort, gaming establishment, tavern, pub, etc.). For example, game outcomes may be generated on a central determination gaming system server 106 and then transmitted over the network to any of a group of remote terminals or remote gaming devices 104A-104X that utilize the game outcomes and display the results to the players.

Gaming device 104A is often of a cabinet construction which may be aligned in rows or banks of similar devices for placement and operation on a casino floor. The gaming device 104A often includes a main door 117 which provides access to the interior of the cabinet. Gaming device 104A typically includes a button area or button deck 120 accessible by a player that is configured with input switches or buttons 122, an access channel for a bill validator 124, and/or an access channel for a ticket printer 126.

In FIG. 1, gaming device 104A is shown as a Relm XL™ model gaming device manufactured by Aristocrat® Technologies, Inc. As shown, gaming device 104A is a reel machine having a gaming display area 118 comprising a number (typically 3 or 5) of mechanical reels 130 with various symbols displayed on them. The reels 130 are independently spun and stopped to show a set of symbols within the gaming display area 118 which may be used to determine an outcome to the game.

In many configurations, the gaming machine 104A may have a main display 128 (e.g., video display monitor) mounted to, or above, the gaming display area 118. The main display 128 can be a high-resolution LCD, plasma, LED, or OLED panel which may be flat or curved as shown, a cathode ray tube, or other conventional electronically controlled video monitor.

In some embodiments, the bill validator 124 may also function as a "ticket-in" reader that allows the player to use a casino issued credit ticket to load credits onto the gaming device 104A (e.g., in a cashless ticket ("TITO") system). In such cashless embodiments, the gaming device 104A may also include a "ticket-out" printer 126 for outputting a credit ticket when a "cash out" button is pressed. Cashless TITO systems are well known in the art and are used to generate and track unique bar-codes or other indicators printed on tickets to allow players to avoid the use of bills and coins by loading credits using a ticket reader and cashing out credits using a ticket-out printer 126 on the gaming device 104A.

In some embodiments, a player tracking card reader 144, a transceiver for wireless communication with a player's smartphone, a keypad 146, and/or an illuminated display 148 for reading, receiving, entering, and/or displaying player tracking information is provided in EGM 104A. In such embodiments, a game controller within the gaming device 104A can communicate with the player tracking system server 110 to send and receive player tracking information.

Gaming device 104A may also include a bonus topper wheel 134. When bonus play is triggered (e.g., by a player achieving a particular outcome or set of outcomes in the primary game), bonus topper wheel 134 is operative to spin and stop with indicator arrow 136 indicating the outcome of the bonus game. Bonus topper wheel 134 is typically used to play a bonus game, but it could also be incorporated into play of the base or primary game.

A candle 138 may be mounted on the top of gaming device 104A and may be activated by a player (e.g., using a switch or one of buttons 122) to indicate to operations staff that gaming device 104A has experienced a malfunction or the player requires service. The candle 138 is also often used to indicate a jackpot has been won and to alert staff that a hand payout of an award may be needed.

There may also be one or more information panels 152 which may be a back-lit, silkscreened glass panel with lettering to indicate general game information including, for example, a game denomination (e.g., $0.25 or $1), pay lines, pay tables, and/or various game related graphics. In some embodiments, the information panel(s) 152 may be implemented as an additional video display.

Gaming devices 104A have traditionally also included a handle 132 typically mounted to the side of main cabinet 116 which may be used to initiate game play.

Figure 2:
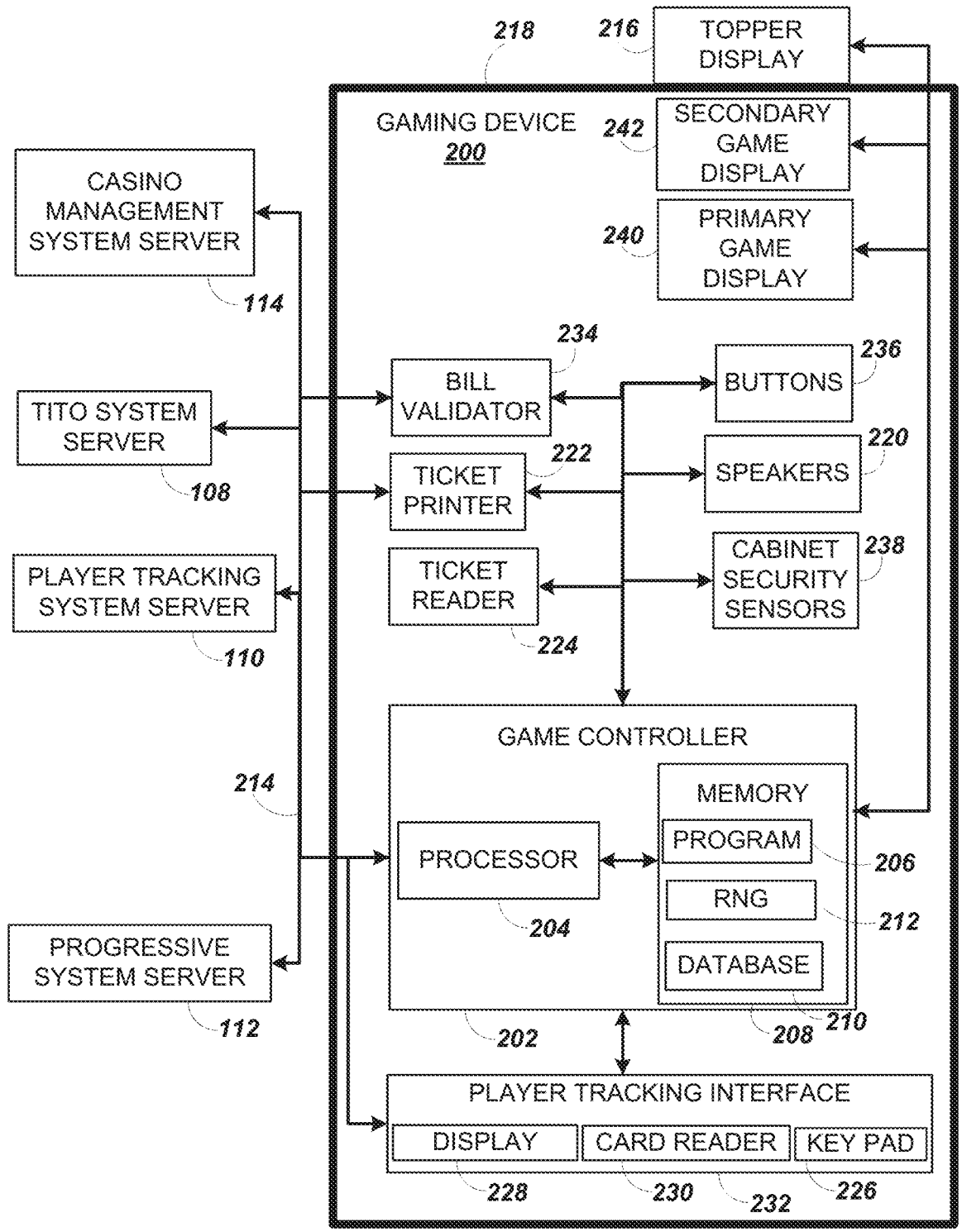
FIG. 2 is a block diagram showing examples of various functional elements of an EGM.

Many or all the above described components can be controlled by circuitry (e.g., a gaming controller) housed inside the main cabinet 116 of the gaming device 104A, the details of which are shown in FIG. 2.

Note that not all gaming devices suitable for implementing embodiments of the present invention necessarily include top wheels, top boxes, information panels, cashless ticket systems, and/or player tracking systems. Further, some suitable gaming devices have only a single game display that includes only a mechanical set of reels and/or a video display, while others are designed for bar counters or table tops and have displays that face upwards.

An alternative example gaming device 104B illustrated in FIG. 1 is the Arc™ model gaming device manufactured by Aristocrat® Technologies, Inc. Note that where possible, reference numerals identifying similar features of the gaming device 104A embodiment are also identified in the gaming device 104B embodiment using the same reference numbers. Gaming device 104B does not include physical reels and instead shows game play functions on main display 128. An optional topper screen 140 may be used as a secondary game display for bonus play, to show game features or attraction activities while a game is not in play, or any other information or media desired by the game designer or operator. In some embodiments, topper screen 140 may also or alternatively be used to display progressive jackpot prizes available to a player during play of gaming device 104B.

Example gaming device 104B includes a main cabinet 116 including a main door 117 which opens to provide access to the interior of the gaming device 1048. The main or service door 117 is typically used by service personnel to refill the ticket-out printer 126 and collect bills and tickets inserted into the bill validator 124. The door 117 may also be accessed to reset the machine, verify and/or upgrade the software, and for general maintenance operations.

Another example gaming device 104C shown is the Helix™ model gaming device manufactured by Aristocrat® Technologies, Inc. Gaming device 104C includes a main display 128A that is in a landscape orientation. Although not illustrated by the front view provided, the landscape display 128A may have a curvature radius from top to bottom, or alternatively from side to side. In some embodiments, display 128A is a flat panel display. Main display 128A is typically used for primary game play while secondary display 128B is typically used for bonus game play, to show game features or attraction activities while the game is not in play or any other information or media desired by the game designer or operator.

Many different types of games, including mechanical slot games, video slot games, video poker, video black jack, video pachinko, keno, bingo, and lottery, may be provided with or implemented within the depicted gaming devices 104A-104C and other similar gaming devices. Each gaming device may also be operable to provide many different games. Games may be differentiated according to themes, sounds, graphics, type of game (e.g., slot game vs. card game vs. game with aspects of skill), denomination, number of paylines, maximum jackpot, progressive or non-progressive, bonus games, and may be deployed for operation in Class 2 or Class 3, etc.

FIG. 2 is a block diagram depicting examples of internal electronic components of a gaming device 200 connected to various external systems. All or parts of the example gaming device 200 shown could be used to implement any one of the example gaming devices 104A-X depicted in FIG. 1. The games available for play on the gaming device 200 are controlled by a game controller 202 that includes one or more processors 204 and a game that may be stored as game software or a program 206 in a memory 208 coupled to the processor 204. The memory 208 may include one or more mass storage devices or media that are housed within gaming device 200. Within the mass storage devices and/or memory 208, one or more databases 210 may be provided for use by the program 206. A random number generator (RNG) 212 that can be implemented in hardware and/or software is typically used to generate random numbers that are used in the operation of game play to ensure that game play outcomes are random and meet regulations for a game of chance.

Alternatively, a game instance (i.e. a play or round of the game) may be generated on a remote gaming device such as a central determination gaming system server 106 (not shown in FIG. 2 but see FIG. 1). The game instance is communicated to gaming device 200 via the network 214 and then displayed on gaming device 200. Gaming device 200 may execute game software, such as but not limited to video streaming software that allows the game to be displayed on gaming device 200. When a game is stored on gaming device 200, it may be loaded from a memory 208 (e.g., from a read only memory (ROM)) or from the central determination gaming system server 106 to memory 208. The memory 208 may include RAM, ROM or another form of storage media that stores instructions for execution by the processor 204.

The gaming device 200 may include a topper display 216 or another form of a top box (e.g., a topper wheel, a topper screen, etc.) which sits above main cabinet 218. The gaming cabinet 218 or topper display 216 may also house a number of other components which may be used to add features to a game being played on gaming device 200, including speakers 220, a ticket printer 222 which prints bar-coded tickets or other media or mechanisms for storing or indicating a player's credit value, a ticket reader 224 which reads bar-coded tickets or other media or mechanisms for storing or indicating a player's credit value, and a player tracking interface 232. The player tracking interface 232 may include a keypad 226 for entering information, a player tracking display 228 for displaying information (e.g., an illuminated or video display), and a card reader 230 for receiving data and/or communicating information to and from media or a device such as a smart phone enabling player tracking. Ticket printer 222 may be used to print tickets for a TITO system server 108. The gaming device 200 may further include a bill validator 234, buttons 236 for player input, cabinet security sensors 238 to detect unauthorized opening of the cabinet 218, a primary game display 240, and a secondary game display 242, each coupled to and operable under the control of game controller 202.

Gaming device 200 may be connected over network 214 to player tracking system server 110. Player tracking system server 110 may be, for example, an OASIS® system manufactured by Aristocrat® Technologies, Inc. Player tracking system server 110 is used to track play (e.g. amount wagered, games played, time of play and/or other quantitative or qualitative measures) for individual players so that an operator may reward players in a loyalty program. The player may use the player tracking interface 232 to access his/her account information, activate free play, and/or request various information. Player tracking or loyalty programs seek to reward players for their play and help build brand loyalty to the gaming establishment. The rewards typically correspond to the player's level of patronage (e.g., to the player's playing frequency and/or total amount of game plays at a given casino). Player tracking rewards may be complimentary and/or discounted meals, lodging, entertainment and/or additional play. Player tracking information may be combined with other information that is now readily obtainable by a casino management system.

Gaming devices, such as gaming devices 104A-104X, 200, are highly regulated to ensure fairness and, in many cases, gaming devices 104A-104X, 200 are operable to award monetary awards (e.g., typically dispensed in the form of a redeemable voucher). Therefore, to satisfy security and regulatory requirements in a gaming environment, hardware and software architectures are implemented in gaming devices 104A-104X, 200 that differ significantly from those of general-purpose computers. Adapting general purpose computers to function as gaming devices 200 is not simple or straightforward because of: 1) the regulatory requirements for gaming devices 200, 2) the harsh environment in which gaming devices 200 operate, 3) security requirements, 4) fault tolerance requirements, and 5) the requirement for additional special purpose componentry enabling functionality of an EGM. These differences require substantial engineering effort with respect to game design implementation, hardware components and software.

When a player wishes to play the gaming device 200, he/she can insert cash or a ticket voucher through a coin acceptor (not shown) or bill validator 234 to establish a credit balance on the gamine machine. The credit balance is used by the player to place wagers on instances of the game and to receive credit awards based on the outcome of winning instances. The credit balance is decreased by the amount of each wager and increased upon a win. The player can add additional credits to the balance at any time. The player may also optionally insert a loyalty club card into the card reader 230. During the game, the player views the game outcome on the game displays 240, 242. Other game and prize information may also be displayed.

For each game instance, a player may make selections, which may affect play of the game. For example, the player may vary the total amount wagered by selecting the amount bet per line and the number of lines played. In many games, the player is asked to initiate or select options during course of game play (such as spinning a wheel to begin a bonus round or select various items during a feature game). The player may make these selections using the player-input buttons 236, the primary game display 240 which may be a touch screen, or using some other device which enables a player to input information into the gaming device 200.

During certain game events, the gaming device 200 may display visual and auditory effects that can be perceived by the player. These effects add to the excitement of a game, which makes a player more likely to enjoy the playing experience. Auditory effects include various sounds that are projected by the speakers 220. Visual effects include flashing lights, strobing lights or other patterns displayed from lights on the gaming device 200 or from lights behind the information panel 152 (FIG. 1).

When the player is done, he/she cashes out the credit balance (typically by pressing a cash out button to receive a ticket from the ticket printer 222). The ticket may be "cashed-in" for money or inserted into another machine to establish a credit balance for play.

Figure 3:
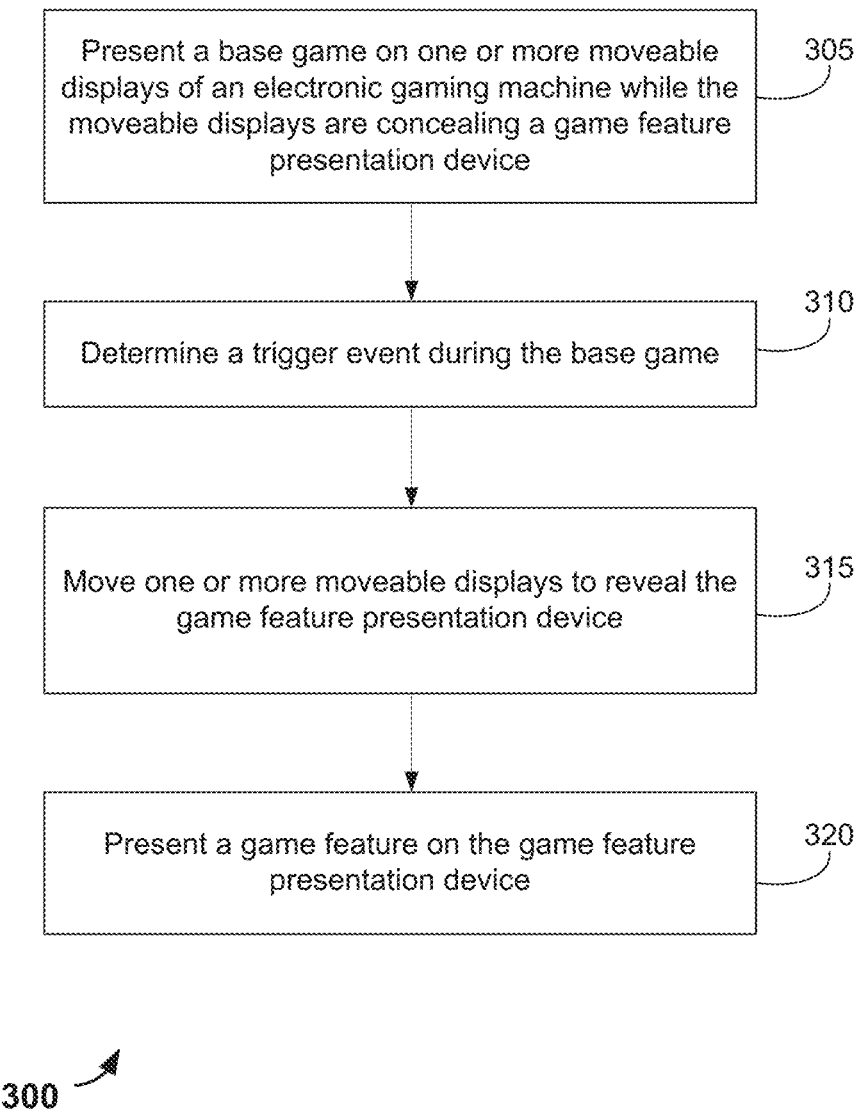
FIG. 3 is a flow diagram that shows blocks of a method according to one example.

FIG. 3 is a flow diagram that shows blocks of a method according to one example. Method 300 may be performed, at least in part, by a control system of an EGM. The control system may include at least one of a general purpose single- or multi-chip processor, a digital signal processor (DSP), an application specific integrated circuit (ASIC), a field programmable gate array (FPGA) or other programmable logic device, discrete gate or transistor logic, or discrete hardware components. Accordingly, the control system may include one or more processors and may be, or may include, an instance of the game controller 202 described above with reference to FIG. 2. In some implementations the control system may include one or more non-transitory storage media operatively coupled to the one or more processors. In some examples, the method 300 may be performed by an EGM according to software stored upon one or more non-transitory storage media. As with other methods described herein, the number and sequence of blocks shown in FIG. 3 are merely examples. Similar disclosed methods may include more or fewer blocks. Moreover, at least some of the blocks may occur in a different sequence than the sequence that is shown in a flow diagram.

According to this example, block 305 involves presenting a base game on one or more moveable displays of an EGM while the one or more moveable displays are in a first configuration. When in the first configuration, the one or more moveable displays are positioned to conceal a game feature presentation device that may include a stationary display, mechanical reels, etc. In some implementations, block 305 involves presenting a video slot game on the one or more moveable displays. However, in other implementations block 305 may involve presenting another type of base game, such as a video poker game, a video black jack game, a video pachinko game, a keno game, a bingo game, etc., on the one or more moveable displays.

In this example, block 310 involves determining a trigger event during the base game. In some examples, the trigger event corresponds to an event of the base game, such as a predetermined combination of symbols. According to some examples, the trigger event may correspond to a win of the base game. Alternatively, or additionally, the trigger event may correspond to the award of one or more bonus games, which may or may not be instances of the base game. However, in some alternative implementations the trigger event may be unrelated to an event of a base game or of a bonus game.

According to some examples the trigger event may be determined by a random number generator (such as the RNG 212 that is described above with reference to FIG. 2) that is implemented by the control system of an EGM. However, in some examples block 310 may involve a determination made by a device other than the EGM that is presenting the base game. In some implementations determining a trigger event may involve receiving, via a network interface system of an EGM, data corresponding to the trigger event. Such data may, for example, be received from a game server or a progressive system server.

In this example shown in FIG. 3, block 315 involves moving one or more moveable displays to reveal the game feature presentation device. Block 315 may, for example, involve a control system of an EGM controlling a motor system of the EGM. The motor system may include one or more electric motors that are configured to position the moveable display(s). Various examples are described below with reference to FIGS. 4A-13B.

According to this example, block 320 involves presenting a game feature on the game feature presentation device. The game feature may vary according to the particular implementation. In some examples, the game feature may include visual effects corresponding to a bonus game, visual effects corresponding to an aspect of the base game that was not previously being presented on the movable display(s) and/or visual effects corresponding to a presentation of a celebration.

For example, if the game feature presentation device includes mechanical reels, these mechanical reels may be used to provide free spins of a bonus game in block 320, regardless of whether the base game was a slot game or another type of game. In another example, if the game feature presentation device includes a stationary display that was hidden when the one or more movable displays were in the first configuration, the stationary display may be used to present a bonus feature, such as one or more instances of a bonus game. The bonus game may or may not be the same type of game as the base game that was presented on the movable display(s) in block 305. For example, if the base game that was presented on the movable display(s) in block 305 was a video poker game, the bonus game presented by the game feature presentation device may be a slot game or a spinning wheel game, such as a simulated roulette game. Alternatively, or additionally, the bonus feature presented by the stationary display may be a simulated spin of a bonus wheel.

According to some implementations, the movable display(s) may be used to present visual effects corresponding to those that are presented by the game feature presentation device. For example, if the EGM determines that a player wins an award during a bonus game that is presented by the game feature presentation device, the movable display(s) may be used to present visual effects corresponding to a celebration of the player's win.

Figure 4A:
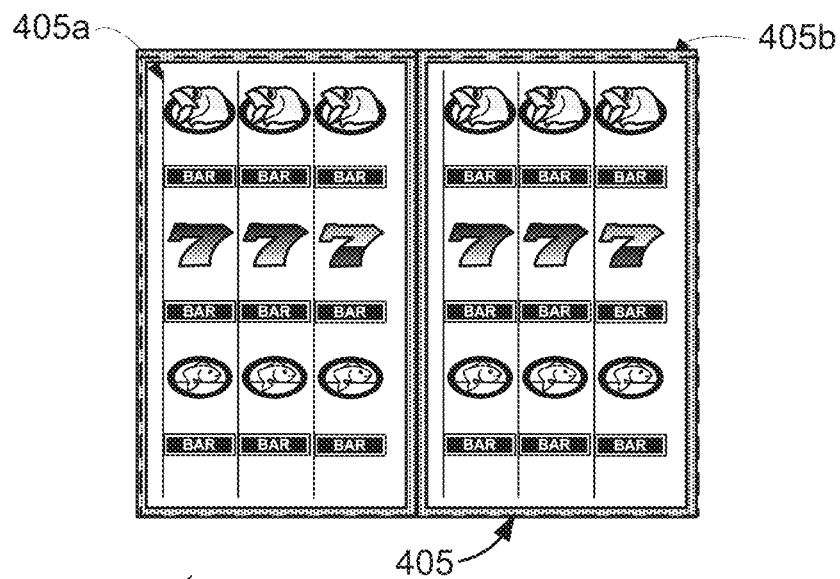
FIG. 4A shows an example of a base game being presented on moveable displays of an EGM while the moveable displays are in a first configuration in which a game feature presentation device is not viewable.

FIG. 4A shows an example of a base game being presented on moveable displays of an EGM while the moveable displays are in a first configuration in which a game feature presentation device is not viewable. As with the other drawings presented herein, the numbers and types of elements shown on FIG. 4A are merely examples. According to this example, a base game is being presented on the moveable displays 405a and 405b. Here, the base game is a slot game. This is an example of block 305 of FIG. 3. However, in some examples a bonus game may be presented on the moveable displays 405a and 405b. In some alternative examples, a video poker game, a video blackjack game, a roulette game, a video bingo game, a keno game, or another type of game may be presented on the moveable displays 405a and 405b.

According to some implementations, the one or more moveable displays referenced in block 305 include two moveable displays that can be controlled to present a base game as if the base game were being presented on a single display 405. For example, the moveable display 405a shown in FIG. 4A may be used to present a left portion of an image of a base game while the moveable display 405b used to present a right portion of the image. Accordingly, such moveable displays may be referred to herein as "moveable display portions."

Figure 4B:
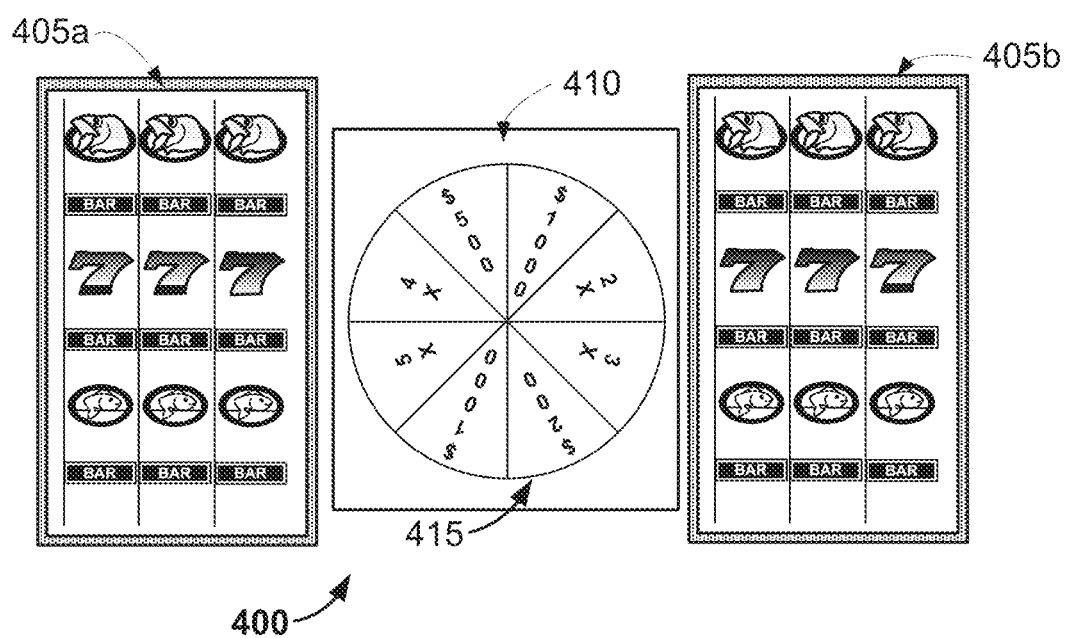
FIG. 4B shows an example of moveable displays that are in a second configuration in which a game feature presentation device is viewable.

FIG. 4B shows an example of moveable displays that are in a second configuration in which a game feature presentation device is viewable. In this example, a control system of an EGM has caused the moveable displays 405a and 405b to be moved laterally, in response to a determined trigger event, so as to reveal an underlying game feature presentation device 410. Here, the control system is configured to control a motor system of the EGM to move each of the two moveable display portions laterally from the first configuration to the second configuration.

According to this example, the game feature presentation device 410 is a stationary display. In FIG. 4B, the game feature presentation device 410 is presenting a game feature, which is a bonus wheel 415 in this example. The trigger event may, for example, have been a win of the base game or of a bonus game. A control system of the EGM may control the game feature presentation device 410 to simulate a spin of the bonus wheel 415 and to indicate an outcome of the spin. According to this implementation, the outcome may be a cash award or a multiplier of the amount won in the base game or the bonus game.

Figure 5A:
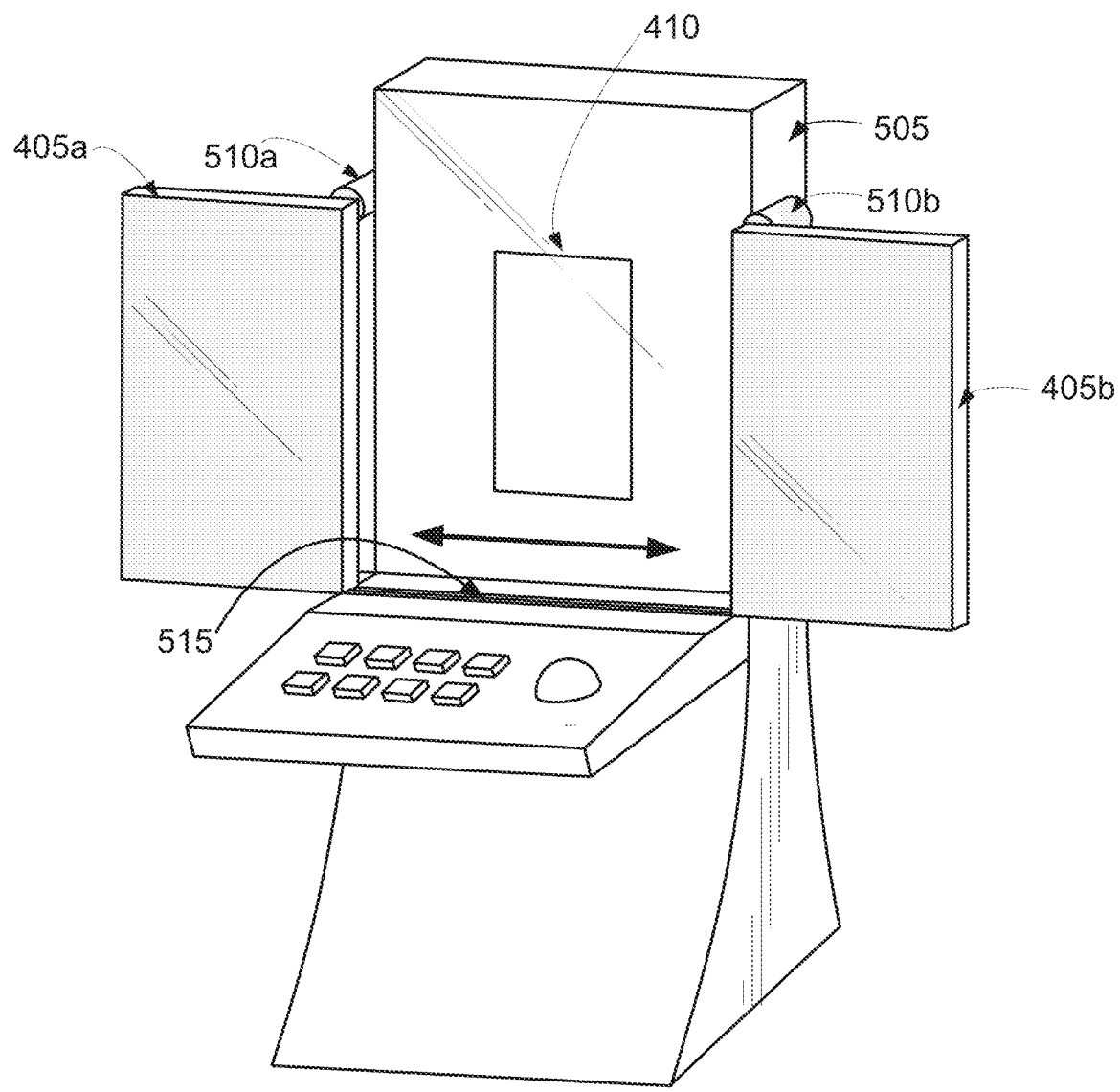
FIGS. 5A-6B show examples of EGMs that may be used to implement the features shown in FIGS. 4A and 4B.

FIGS. 5A-6B show examples of EGMs that may be used to implement the features shown in FIGS. 4A and 4B. FIG. 5A shows an example of an EGM that has caused the moveable displays 405a and 405b to be moved laterally from a first configuration in which the game feature presentation device 410 was hidden to a second configuration in which the game feature presentation device 410 is revealed. The moveable displays 405a and 405b may be moved from the first configuration to the second configuration in response to a trigger event. Here, the game feature presentation device 410 is a stationary display.

When the moveable displays 405a and 405b are in the second configuration, a control system of the EGM may control the moveable displays 405a and 405b to present visual effects that correspond with what is being presented by the game feature presentation device 410. For example, if the game feature presentation device 410 is being controlled to present a poker game, the moveable displays 405a and 405b may present visual effects that correspond with the poker game. If the game feature presentation device 410 is being controlled to present a bonus game, the moveable displays 405a and 405b may present visual effects that correspond with the bonus game. If the game feature presentation device 410 is being controlled to indicate that a player has won an award, the moveable displays 405a and 405b may present visual effects that correspond with a celebration of the award.

In this implementation, the moveable displays 405a and 405b can be moved laterally along the track 515. According to this example, a control system of the EGM is configured to control a motor system to move each of the two moveable displays laterally from the first configuration to the second configuration. In this example, the motor system includes the motor assembly 510a, which is configured to position the moveable display 405a, and the motor assembly 510b, which is configured to position the moveable display 405b. Here, the motor assemblies 510a and 510b are affixed to the exterior of the EGM cabinet 505.

Figure 5B:
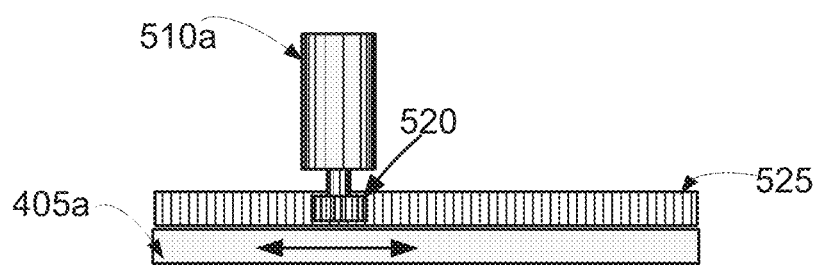

FIG. 5B shows a top view of one of the motor assemblies depicted in FIG. 5A. The motor assembly 510a may, for example, include a stepper motor. In this example, the motor assembly 510a includes a gear 520 that is configured to position the moveable display 405a according to instructions from a control system of the EGM. According to this implementation, teeth of the gear 520 are configured to fit into corresponding teeth of the bracket 525.

Figure 6A:
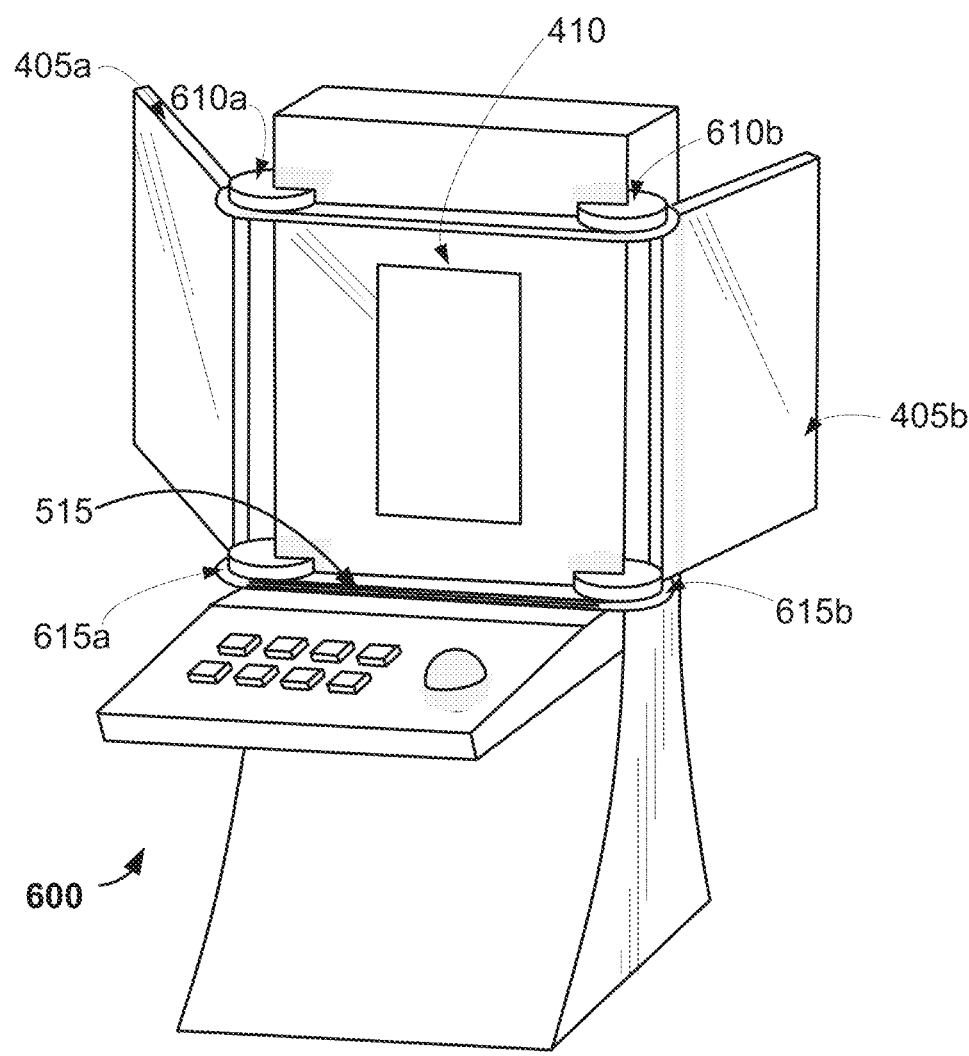
Figure 6B:
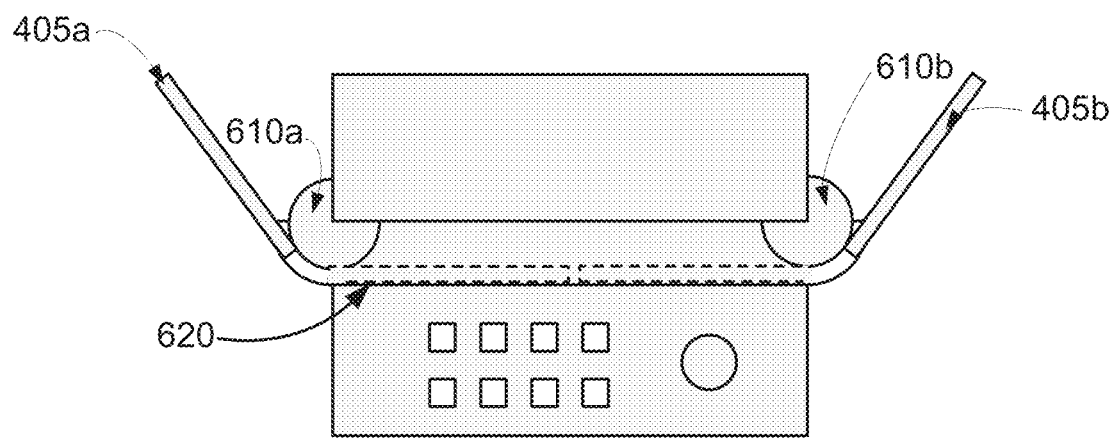

FIGS. 6A and 6B show alternative examples of positioning movable displays. FIGS. 6A and 6B show the moveable displays 405a and 405b in the second configuration, in which the game feature presentation device 410 is revealed. FIG. 6B is a top view of the EGM that includes dashed lines 620 indicating the positions of the moveable displays 405a and 405b when they are in the first configuration, in which the game feature presentation device 410 is hidden.

According to these examples, the motor assemblies 610a and 610b are configured to both slide and rotate the moveable displays 405a and 405b as they are moved from the first configuration to the second configuration. When the motor assemblies 610a and 610b begin to move the moveable displays 405a and 405b from the first configuration, the motor assemblies 610a and 610b slide the moveable displays 405a and 405b laterally along the track 515.

After the motor assemblies 610a and 610b have moved the moveable displays 405a and 405b beyond the track 515, the motor assemblies 610a and 610b rotate the moveable displays 405a and 405b into the second configuration. In this example, a bottom edge of the moveable display 405a is supported by the flange 615a and a bottom edge of the moveable display 405b is supported by the flange 615b.

According to some alternative implementations, the motor assemblies 610a and 610b rotate the moveable displays 405a and 405b from the first configuration to the second configuration. In some such implementations, the motor assemblies 610a and 610b rotate the moveable displays 405a and 405b from the first configuration to the second configuration without sliding the moveable display 405a or the moveable display 405b.

Figure 7A:
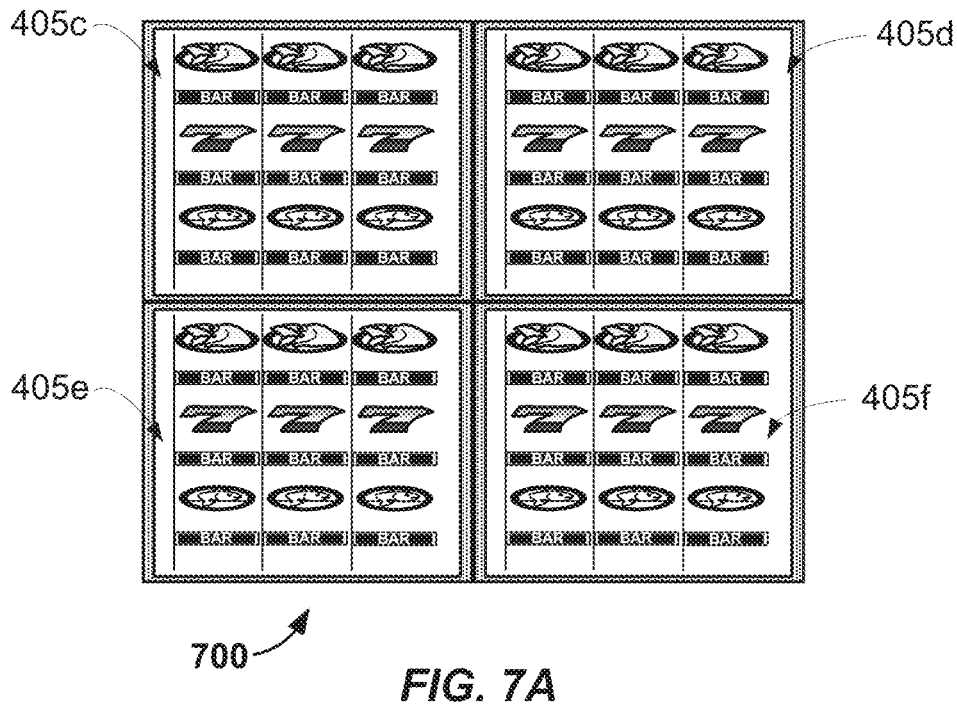
FIGS. 7A and 7B show alternative examples configuring moveable displays of an EGM.
Figure 7B:
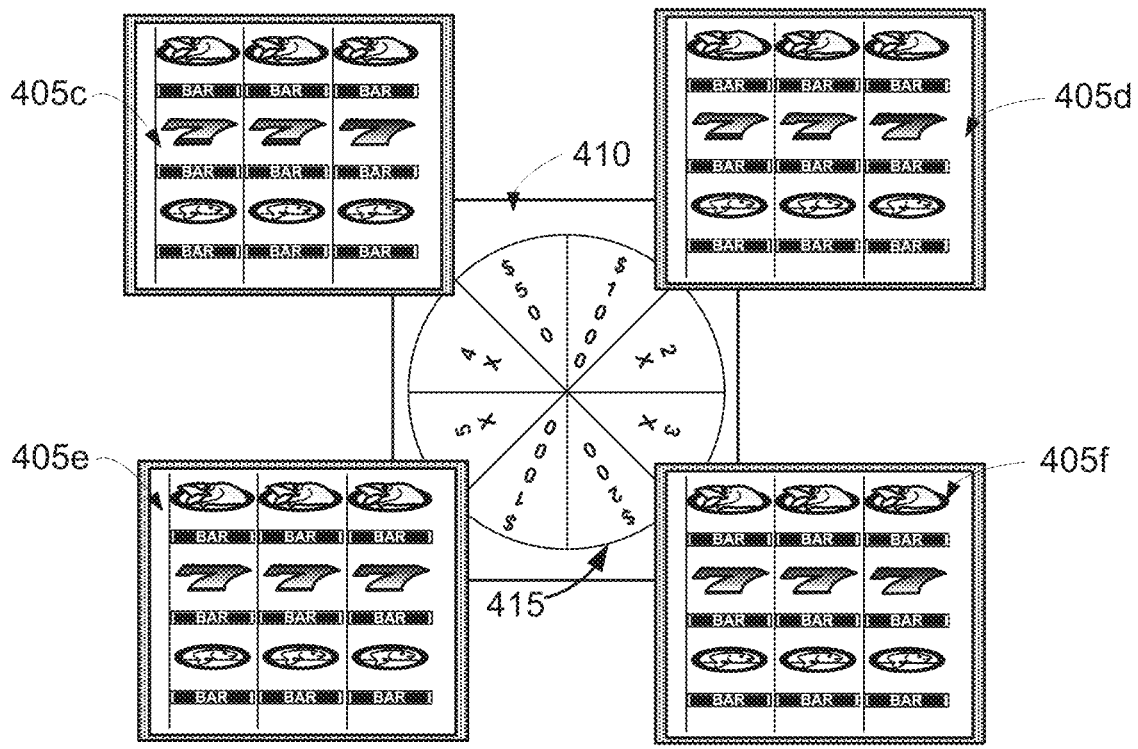

FIGS. 7A and 7B show alternative examples configuring moveable displays of an EGM. FIG. 7A shows the moveable displays 405c-405f in a first configuration in which an underlying game feature presentation device of the EGM 700 is not visible. Accordingly, there are four movable displays in this example. In this example, a base game is being presented on the moveable displays 405c-405f. Accordingly, FIG. 7A shows an example of block 305 of FIG. 3. Here, the base game is a slot game. However, in some examples a bonus game, or another type of game, may be presented on the moveable displays 405c-405f.

According to some implementations, the one or more moveable displays referenced in block 305 include four moveable displays that can be controlled to present a base game as if the base game were being presented on a single display 405. For example, the moveable display 405c may be used to present an upper left portion of an image of a base game while the moveable displays 405d, 405e and 405f are used to present the upper right portion, the lower left portion and the lower right portion, respectively, of the image. Accordingly, such moveable displays may be referred to herein as "moveable display portions."

FIG. 7B shows an example of moveable displays that are in a second configuration in which a game feature presentation device is viewable. In this example, a control system of an EGM 700 has caused the moveable displays 405c-405f to be moved diagonally, in response to a determined trigger event, to reveal an underlying game feature presentation device 410. Here, the control system is configured to control a motor system of the EGM 700 to move each of the four moveable display portions from the first configuration to the second configuration.

According to this example, the game feature presentation device 410 is a stationary display. In FIG. 7B, the game feature presentation device 410 is presenting a game feature, which is a bonus wheel 415 in this example. The trigger event may, for example, have been a win of the base game or of a bonus game. A control system of the EGM 700 may, for example, control the game feature presentation device 410 to simulate a spin of the bonus wheel 415 and to indicate an outcome of the spin.

Figure 8:
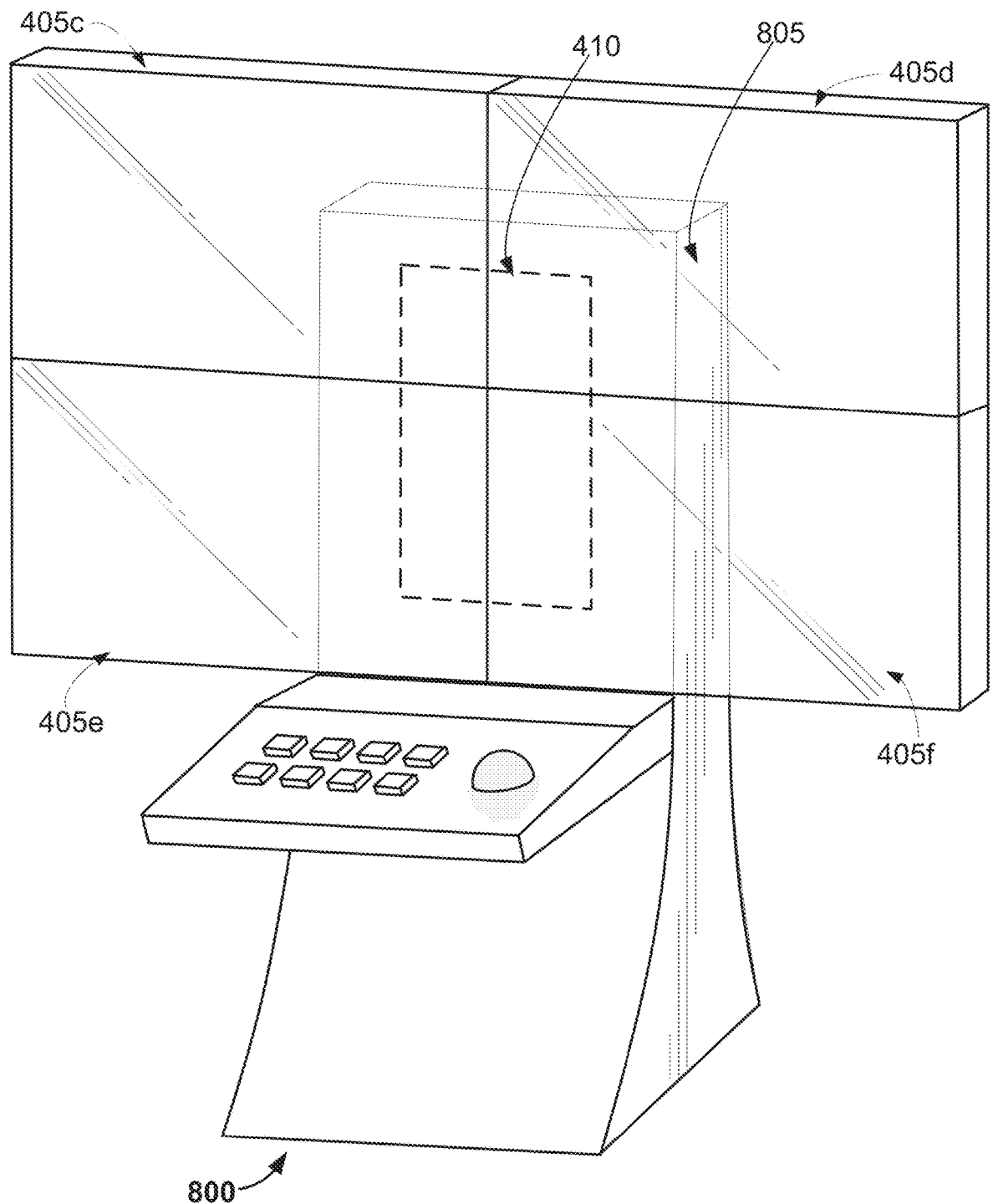
FIGS. 8-10 show examples of EGMs that may be used to implement the features shown in FIGS. 7A and 7B.
Figure 9:
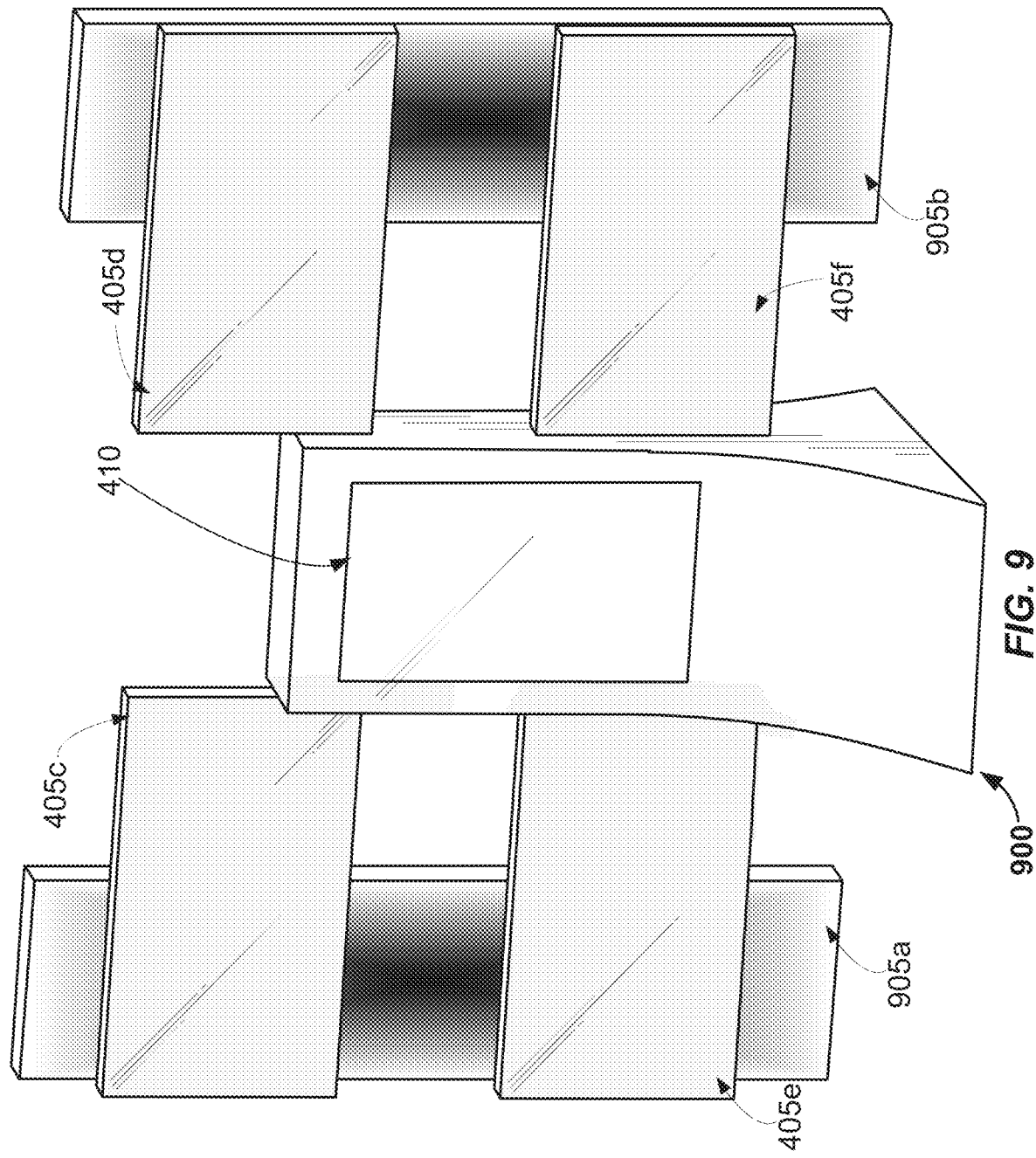
Figure 10:
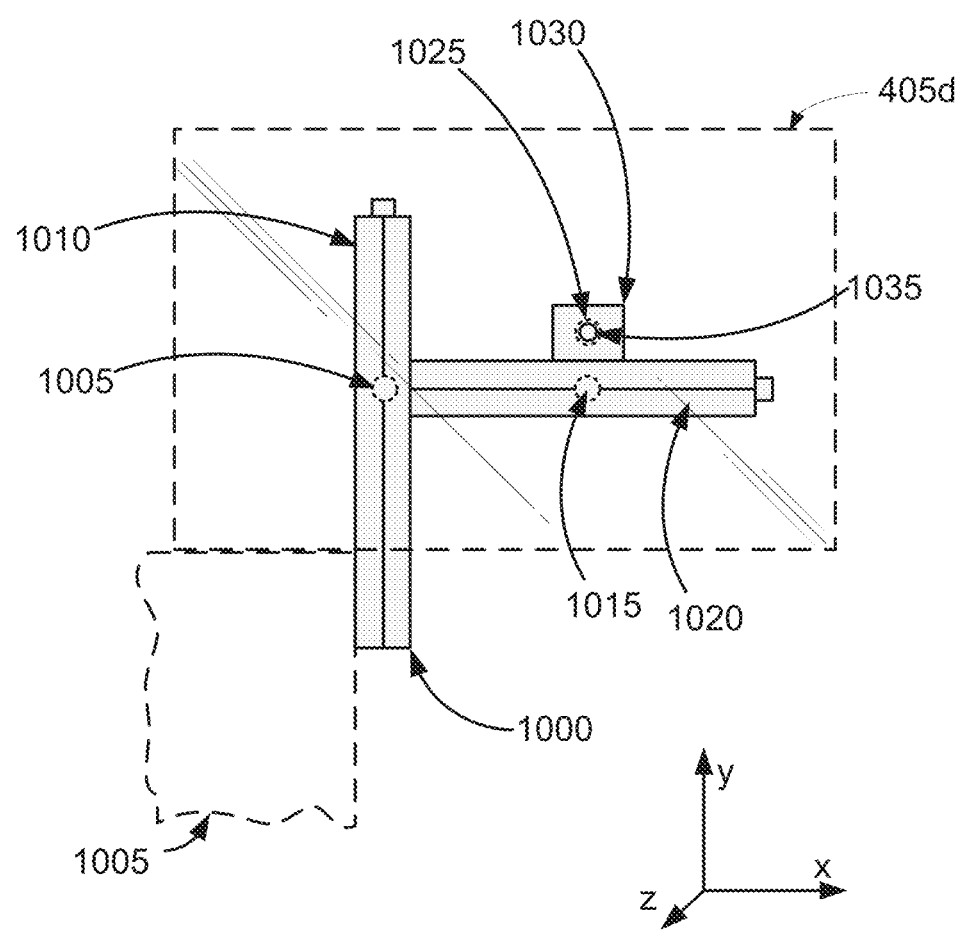

FIGS. 8-10 show examples of EGMs that may be used to implement the features shown in FIGS. 7A and 7B. FIG. 8 shows an example of an EGM 800 at a time during which the moveable displays 405c-405f are in a first configuration wherein an underlying game feature presentation device 410 is hidden from view. In this example, the moveable displays 405c-405f extend beyond the sides of the cabinet 805 and above the cabinet 805 when the moveable displays 405c-405f are in the first configuration. However, in alternative examples the moveable displays 405c-405f may be positioned flush with the top and/or sides of the cabinet 805 when the moveable displays 405c-405f are in the first configuration.

According to some examples, the moveable displays 405c-405f may move in unison from the first configuration to the second configuration, and vice versa. In alternative examples, the moveable displays 405c-405f may move independently from the first configuration to the second configuration, and vice versa. Movement of the moveable displays 405c-405f may, for example, correspond with a choreographed sequence of movements and/or display presentations that has been determined by a game designer.

In some implementations, a motor system that is configured for positioning the moveable displays 405c-405f may be located behind the moveable displays 405c-405f. In some examples, at least a portion of the motor system may be concealed within a structure at the rear of the moveable displays 405c-405f.

FIG. 9 shows an example of an EGM 900 at a time during which the moveable displays 405c-405f are in a second configuration in which an underlying game feature presentation device 410 is revealed. According to this example, the EGM 900 includes panels 905a and 905b that are mounted on the rear of the moveable displays 405c-405f. In this example, the panels 905a and 905b are affixed to the rear of the moveable displays 405c-405f. The panels 905a and 905b may, in some examples, include signage and/or ornamentations that correspond with a theme of the EGM 900. The panels 905a and 905b may, for example be backlit. In some such examples, the panels 905a and 905b may include light-emitting diode and/or liquid crystal displays. However, in alternative implementations the panels 905a and 905b may be configured to slide along the rear of the moveable displays 405c-405f as the moveable displays 405a and 405b are moved from the first configuration to the second configuration, and vice versa. For example, the panels 905a and 905b may be coupled to the moveable displays 405c-405f via ball and screw slide assemblies. In alternative examples, each of the moveable displays 405c-405f may have a corresponding panel.

FIG. 10 shows an example of an apparatus that may be used to position movable displays such as those shown in FIGS. 7A-9. According to some implementations the apparatus 1000, or a similar apparatus, may be used to position other moveable elements, such as the panels 905a and 905b shown in FIG. 9.

In the example shown in FIG. 10, the apparatus 1000 is attached to the moveable display 405d and to a side of an EGM cabinet 1005. According to this example, the apparatus 1000 is configured to move the moveable display 405d along the x axis, the y axis, the z axis, or any combination thereof. In this example, the motor 1005 is configured to move the member 1020 along the y axis and the motor 1015 is configured to move the member 1030 along the x axis. According to this implementation, the member 1030 includes a motor 1025, which is shown with a dashed outline in order to indicate that the motor 1025 is positioned within the member 1030. Here, the motor 1025 is configured to move the member 1035 along the z axis. In this example, the member 1035 is attached to the back of the moveable display 405d. In some implementations, the apparatus 1000 includes multiple instances of the member 1030 and the member 1035, in order to provide additional support for the moveable display 405d.

FIGS. 11A and 11B show alternative examples configuring a moveable display of an EGM. FIG. 11A is a cross-section that shows a side view of the interior of the EGM 1100. Here, the moveable display 405g is shown in a first configuration in which an underlying game feature presentation device 410 of the EGM 1100 is not visible. In this example, the game feature presentation device 410 includes a stationary display. Alternative examples may provide a different type of game feature presentation device 410, such as a set of mechanical reels configured for presenting a slot game.

According to this implementation, the EGM 1100 includes an assembly 1105 and a motor system 1115 for positioning the moveable display 405g. In this example, the assembly 1105 includes telescoping rails 1110a-1110c. Here, the telescoping rail 1110a is coupled to a side portion and a back portion of the moveable display 405g. In some examples, one instance of the telescoping rail 1110a is coupled to one side of the moveable display 405g and another instance of the telescoping rail 1110a is coupled to another side of the moveable display 405g. The telescoping rails 1110a-1110c may be positioned on opposing sides of the game feature presentation device 410 and may be configured to move along the sides of the game feature presentation device 410. The motor system 1115 may be configured to position both instances of the telescoping rails 1110a-1110c.

FIG. 11B is a cross-sectional view of the EGM 1100 that shows the moveable display 405g in a second configuration, in which the game feature presentation device 410 is visible. In this example, a control system of the EGM 1100 has controlled the motor system 1115 to raise the moveable display 405g from the first configuration to a second configuration in which the moveable display 405g is positioned above the game feature presentation device 410. In alternative implementations, the moveable display 405g may be configured to slide in and out of a cabinet of the EGM 1100, behind a stationary display that is viewable when the moveable display 405g is positioned within the EGM 1100.

According to some examples, the one or more moveable displays may include at least one flexible display. In some such examples, a control system of an EGM may be configured to control the motor system to position at least part of the flexible display within a cabinet of the EGM, e.g., when the flexible display is in the second configuration. In alternative implementations, the EGM may be configured to position the flexible display in various configurations outside the cabinet of the EGM.

Figure 12A:
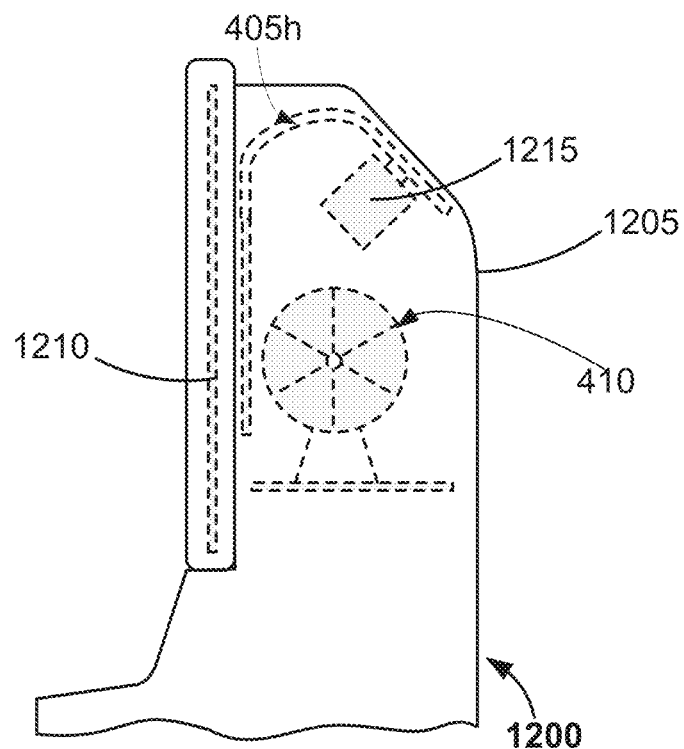
FIGS. 12A and 12B show examples of positioning a flexible display within a cabinet of an EGM.
Figure 12B:
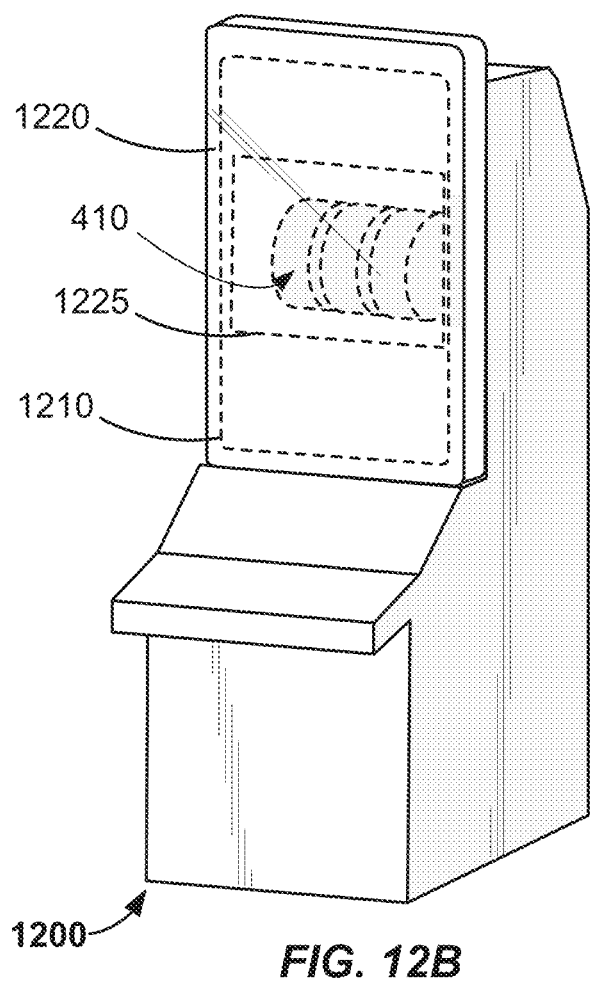

FIGS. 12A and 12B show examples of positioning a flexible display within a cabinet of an EGM. FIG. 12A shows the movable display 405h in a first configuration, in which the movable display 405h conceals a game feature presentation device 410. The movable display 405h may, for example, include a flexible organic light emitting diode (OLED) display. According to this example, the game feature presentation device 410 includes a plurality of mechanical reels that may be used to present a slot game. In some implementations, a base game may be presented on the flexible display 405h when the flexible display 405h is in the first configuration.

In the examples shown in FIGS. 12A and 12B, a rigid and transparent front panel 1210 resides within the EGM 1200. The motor system 1215 is configured to position the flexible display 405h in a desired configuration, according to commands from a control system of the EGM 1200.

FIG. 12B shows the EGM 1200 when the flexible display 405h is in a second configuration in which the game feature presentation device 410 is visible from the exterior of the EGM 1200. The game feature presentation device 410 may, for example, be used to present one or more bonus slot games via the plurality of mechanical reels. In alternative implementations, the game feature presentation device 410 may be, or may include, a stationary display. In the example shown in FIG. 12B, the area of the front panel 1210, represents the viewable area of the main display 1220 when the movable display 405h is in the first configuration. When the movable display 405h is in the first configuration, the game feature presentation device 410 may be viewed through the window 1225.

Figure 13A:
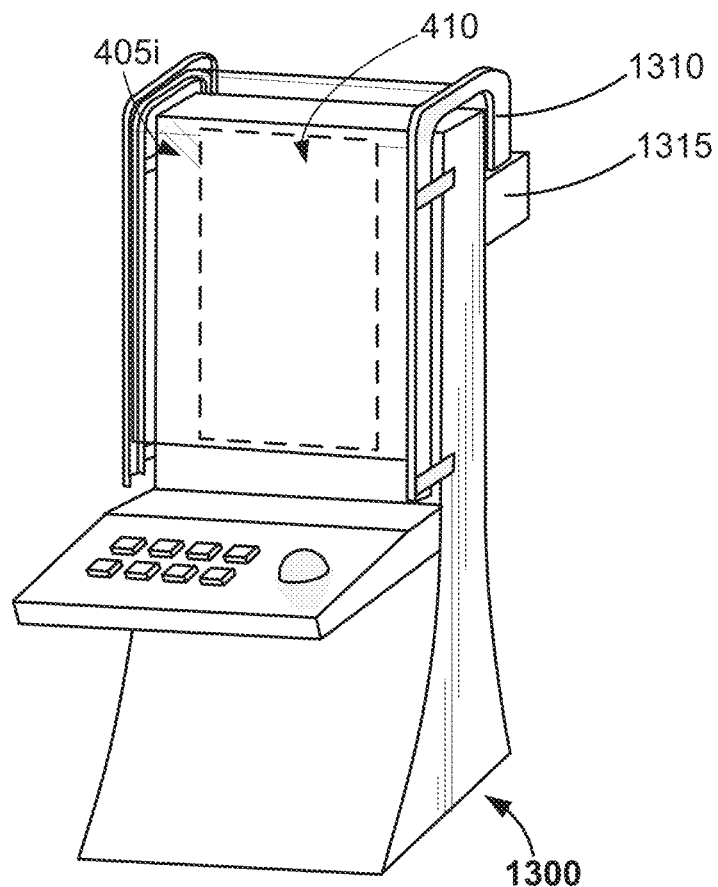
FIGS. 13A and 13B show examples of positioning a flexible display outside a cabinet of an EGM.
Figure 13B:
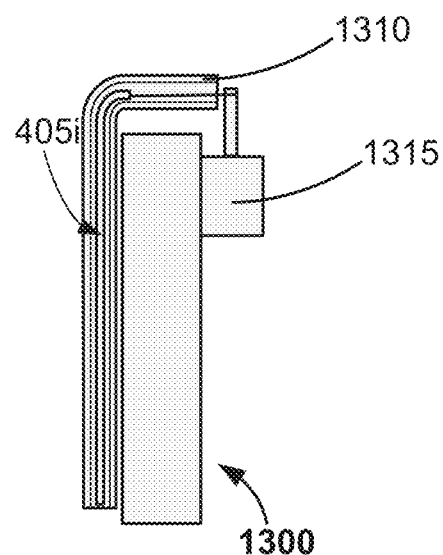

FIGS. 13A and 13B show examples of positioning a flexible display outside a cabinet of an EGM. The movable display 405i may, for example, include a flexible OLED display. Both FIG. 13A and FIG. 13B show the movable display 405i in a first configuration in which the game feature presentation device 410 is hidden from view. In this example, the game feature presentation device 410 is a stationary display.

However, the motor system 1315 is configured to move the movable display 405i to other positions, according to instructions from a control system of the EGM 1300. According to these examples, the motor system 1315 is configured to move the movable display 405i along the rails 1310. The side cross-sectional view of FIG. 13B more clearly shows the movable display 405i positioned inside of the rails 1310. In these examples, the EGM 1300 is configured to move the movable display 405i to a second configuration in which at least part of the game feature presentation device 410 is visible.

Figure 14:
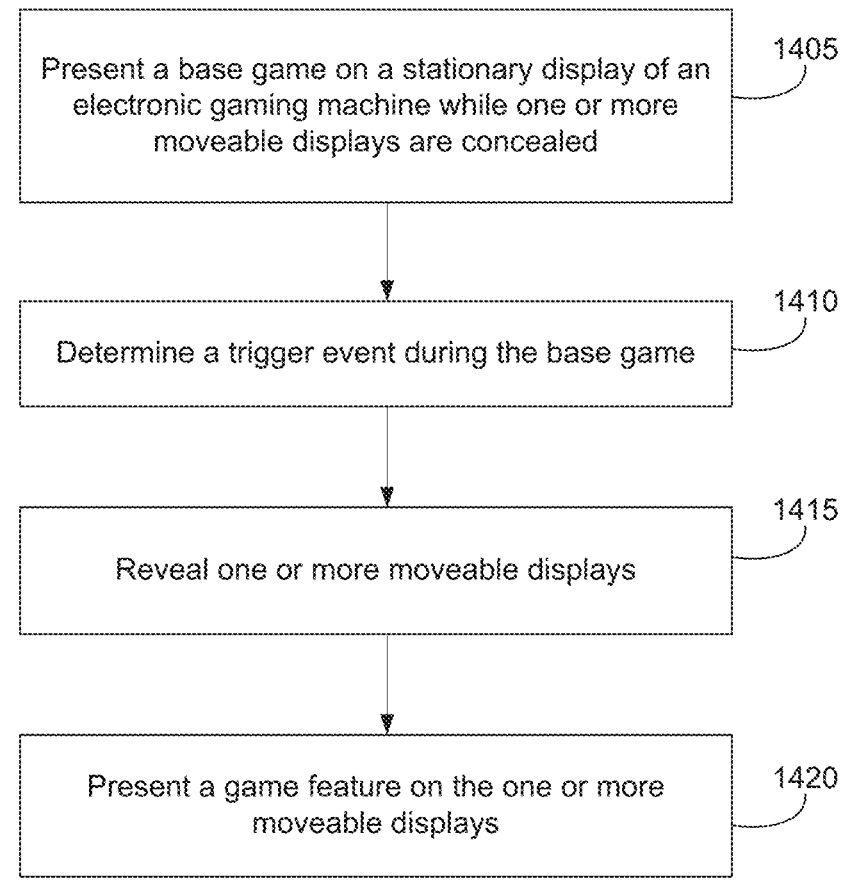
FIG. 14 is a flow diagram that shows blocks of an alternative method according to one example.

FIG. 14 is a flow diagram that shows blocks of an alternative method according to one example. Method 1400 may be performed, at least in part, by a control system of an EGM. The control system may include one or more processors and may be, or may include, an instance of the game controller 202 described above with reference to FIG. 2. In some implementations the control system may include one or more non-transitory storage media operatively coupled to the one or more processors. In some examples, the method 1400 may be performed by an EGM according to software stored upon one or more non-transitory storage media.

According to this example, block 1405 involves presenting a base game on one or more stationary displays of an EGM while one or more moveable displays are in a first configuration. When in the first configuration, the one or more moveable displays are concealed. For example, the one or more moveable displays may not be viewable because the moveable displays are concealed within a cabinet of the EGM. In some implementations, block 1405 involves presenting a video slot game on the stationary display(s). However, in other implementations block 1405 may involve presenting another type of base game, such as a video poker game, a video black jack game, a video pachinko game, a keno game, a bingo game, etc., on the stationary display(s).

In this example, block 1410 involves determining a trigger event during the base game. In some examples, the trigger event corresponds to an event of the base game, such as a predetermined combination of symbols. According to some examples, the trigger event may correspond to a win of the base game. Alternatively, or additionally, the trigger event may correspond to the award of one or more bonus games, which may or may not be instances of the base game. However, in some alternative implementations the trigger event may be unrelated to an event of the base game.

According to some examples the trigger event may be determined by a random number generator (such as the RNG 212 that is described above with reference to FIG. 2) that is implemented by the control system of an EGM. However, in some examples block 1410 may involve a determination made by a device other than the EGM that is presenting the base game. In some implementations determining a trigger event may involve receiving, via a network interface system of an EGM, data corresponding to the trigger event. Such data may, for example, be received from a game server or a progressive system server.

In this example shown in FIG. 14, block 1415 involves revealing one or more of the moveable displays. Block 1415 may, for example, involve a control system of an EGM controlling a motor system of the EGM. The motor system may include one or more electric motors that are configured to position the moveable display(s).

According to this example, block 1420 involves presenting a game feature on one or more of the moveable displays that were revealed in block 1415. The game feature may vary according to the particular implementation. In some examples, the game feature may include visual effects corresponding to a bonus game, visual effects corresponding to an aspect of the base game that was not previously being presented on the movable display(s) and/or visual effects corresponding to a presentation of a celebration.

Figure 15A:
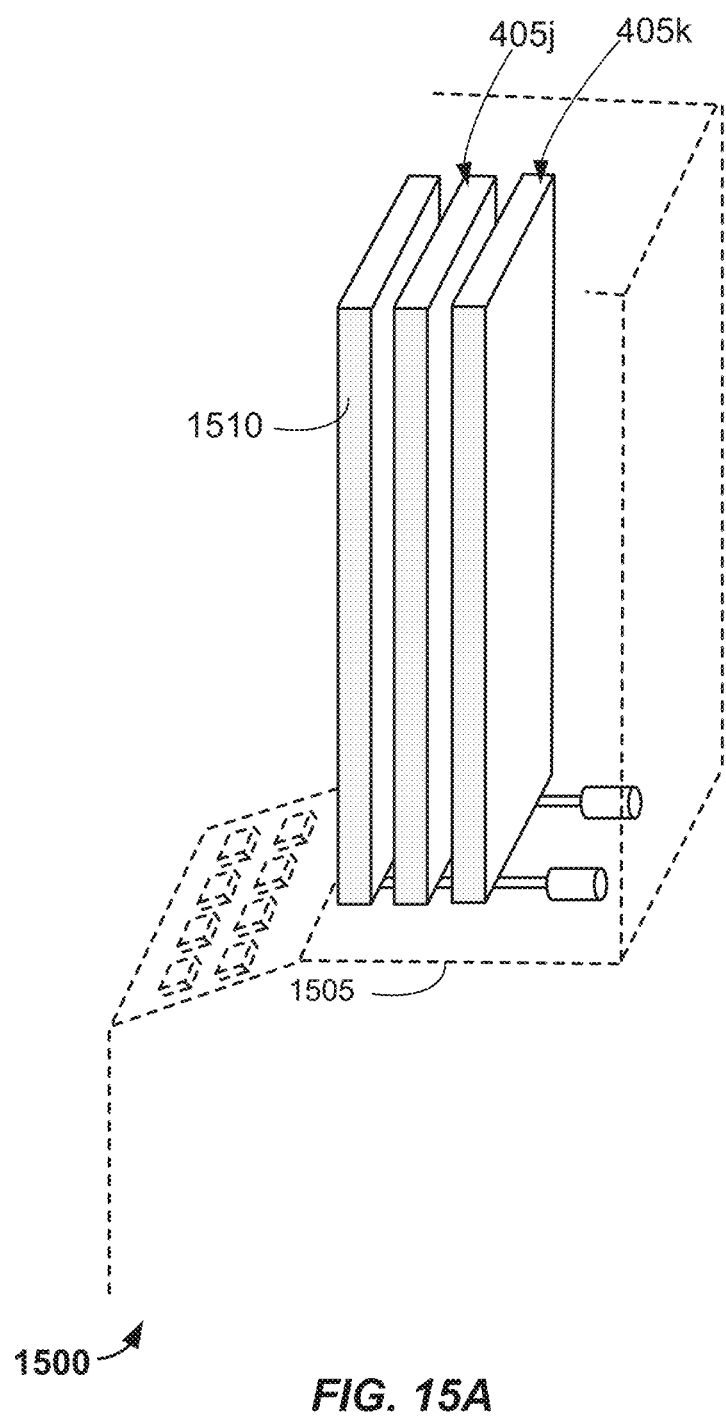
FIGS. 15A and 15B show examples of an EGM that is configured to perform the method of FIG. 14.
Figure 15B:
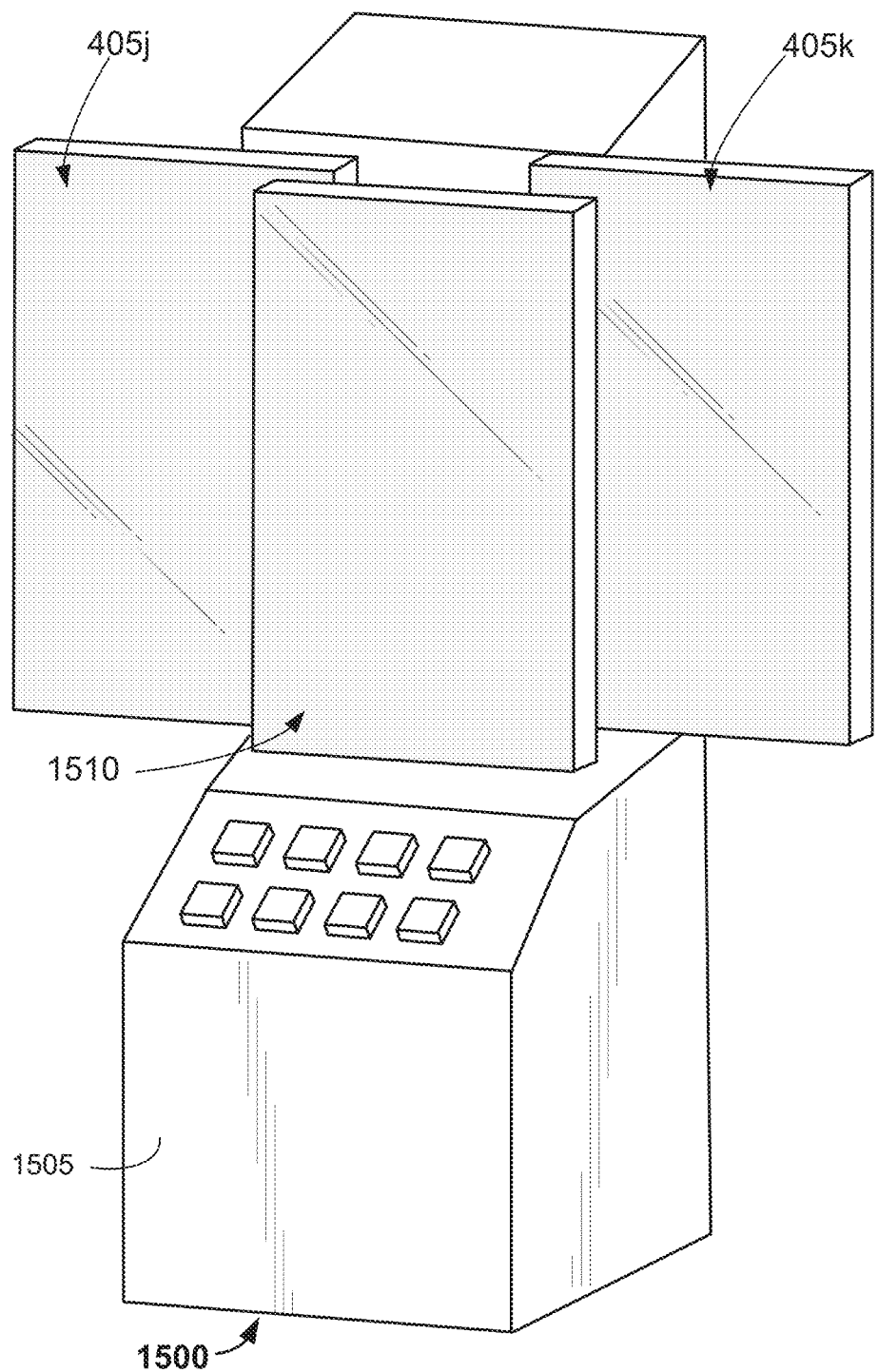

FIGS. 15A and 15B show examples of an EGM that is configured to perform the method of FIG. 14. FIG. 15A is a side view of the EGM 1500, with part of the cabinet 1505 shown as dashed lines. In this example, the display 1510 is a stationary display and the displays 405j and 405k are moveable displays. In alternative implementations, the display 1510 may also be a moveable display. FIG. 15A shows the EGM 1500 in a first configuration in which the moveable displays 405j and 405k are concealed within the cabinet 1505. The EGM 1500 may, for example present a base game on the display 1510 while the moveable displays 405*j* and 405*k* are in the first configuration.

FIG. 15B shows a perspective view of the EGM 1500 when the moveable displays 405*j* and 405*k* are in a second configuration: here, both of the moveable displays 405*j* and 405*k* are viewable from outside of the cabinet 1505 when the moveable displays 405*j* and 405*k* are in the second configuration. According to some examples, game features may be presented on one or more of the moveable displays 405*j* and 405*k* while the moveable displays 405*j* and 405*k* are in the second configuration. The game features may vary according to the particular implementation. In some examples, the game features may include visual effects corresponding to a bonus game that is being presented on the display 1510. For example, the game features may include graphics corresponding to an award of the bonus game, such as visual effects corresponding to a presentation of a celebration. In other examples, the game features may include graphics corresponding to a theme of the game that is being presented on the EGM 1500. For example, if the game has a pirate theme, the game features may include graphics corresponding to piracy, such as a battle scene depicting pirates taking over a ship, a depiction of finding treasure, etc. In some examples, the graphics may only be presented when the EGM 1500 is in the second configuration.

While the invention has been described with respect to the figures, it will be appreciated that many modifications and changes may be made by those skilled in the art without departing from the spirit of the invention. Any variation and derivation from the above description and figures are included in the scope of the present invention as defined by the claims.

What is claimed is:

1. An electronic gaming machine, comprising:
   a display system including a moveable main display having a front surface;
   a motor system configured to position the moveable main display;
   a first telescoping rail and a second telescoping rail coupled to the moveable main display, wherein the first telescoping rail and the second telescoping rail are behind the front surface of the moveable main display when viewed at an angle normal to the front surface; and
   a control system including one or more processors, the control system being configured to:
      control the display system to present a base game on the moveable main display while the moveable main display is in a first configuration in which a game feature presentation device is not viewable based on a first position of the moveable main display,
      determine a trigger event that triggers a bonus game during a presentation of an instance of the base game, and
      control the motor system to move the moveable main display from the first configuration to a second configuration in response to the trigger event, the second configuration being a configuration in which the game feature presentation device is viewable based on a second position of the moveable main display.

2. The electronic gaming machine of claim 1, further comprising a main cabinet with a back surface, wherein the first telescoping rail and the second telescoping rail are interposed between the front surface of the moveable main display and the back surface of the main cabinet when at a view parallel to the front surface.

3. The electronic gaming machine of claim 1, wherein the base game is a primary game and wherein the primary game is a slot game.

4. The electronic gaming machine of claim 1, wherein the trigger event corresponds to a win of the base game and wherein the bonus game is played separately from the base game.

5. The electronic gaming machine of claim 1, wherein the control system is further configured to control the game feature presentation device to present second visual effects corresponding to the bonus game.

6. An electronic gaming machine, comprising:
   a display system including a moveable main display having a front surface;
   a motor system configured to position the moveable main display;
   a first telescoping rail and a second telescoping rail coupled to the moveable main display; and
   a control system including one or more processors, the control system being configured to:
      control the display system to present a base game on the moveable main display while the moveable main display is in a first configuration in which a game feature presentation device is not viewable based on a first position of the moveable main display,
      determine a trigger event that triggers a bonus game during a presentation of an instance of the base game, and
      control the motor system to move the moveable main display from the first configuration to a second configuration in response to the trigger event, the second configuration being a configuration in which the game feature presentation device is viewable based on a second position of the moveable main display.

7. The electronic gaming machine of claim 6, further comprising a main cabinet with a back surface, wherein the first telescoping rail and the second telescoping rail are interposed between the moveable main display and the back surface of the main cabinet when the moveable main display is in the first configuration.

8. The electronic gaming machine of claim 7, wherein the moveable main display is configured to slide in and out of the main cabinet.

9. The electronic gaming machine of claim 6, wherein the first telescoping rail includes at least a first telescoping rail portion and a second telescoping rail portion.

10. The electronic gaming machine of claim 9, wherein the first telescoping rail portion is below the second telescoping rail portion when the moveable main display is in the first configuration.

11. The electronic gaming machine of claim 9, wherein the first telescoping rail portion is above the second telescoping rail portion when the moveable main display is in the second configuration.

12. The electronic gaming machine of claim 6, wherein the first telescoping rail and the second telescoping rail are coupled to side portions of the moveable main display.

13. The electronic gaming machine of claim 6, wherein the first telescoping rail and the second telescoping rail are positioned on opposing sides of the game feature presentation device.

14. The electronic gaming machine of claim 6, wherein the first telescoping rail and the second telescoping rail are configured to move along sides of the game feature presentation device.

15. The electronic gaming machine of claim 6, wherein the first telescoping rail and the second telescoping rail are coupled to a back portion of the moveable main display.

16. The electronic gaming machine of claim 6, wherein the moveable main display is positioned above the game feature presentation device when the moveable main display is in the second configuration.

17. The electronic gaming machine of claim 6, wherein the motor system is configured to position the first telescoping rail and the second telescoping rail.

18. The electronic gaming machine of claim 6, wherein the base game is a primary game and wherein the primary game is a slot game.

19. The electronic gaming machine of claim 6, wherein the trigger event corresponds to a win of the base game and wherein the bonus game is played separately from the base game.

20. The electronic gaming machine of claim 6, wherein the control system is further configured to control the game feature presentation device to present second visual effects corresponding to the bonus game.

* * * * *